(12) United States Patent
Vermani et al.

(10) Patent No.: US 10,454,538 B2
(45) Date of Patent: Oct. 22, 2019

(54) METHODS AND SYSTEMS FOR JOINT ACCESS POINT MIMO TRANSMISSIONS

(71) Applicant: QUALCOMM Incorporated, San Diego, CA (US)

(72) Inventors: Sameer Vermani, San Diego, CA (US); Bin Tian, San Diego, CA (US); Lochan Verma, San Diego, CA (US); Jialing Li Chen, San Diego, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/125,654

(22) Filed: Sep. 7, 2018

(65) Prior Publication Data
US 2019/0081664 A1  Mar. 14, 2019

Related U.S. Application Data

(60) Provisional application No. 62/556,096, filed on Sep. 8, 2017.

(51) Int. Cl.
*H04B 7/0417* (2017.01)
*H04B 7/0456* (2017.01)
*H04B 7/024* (2017.01)
*H04L 5/00* (2006.01)

(52) U.S. Cl.
CPC .......... *H04B 7/0417* (2013.01); *H04B 7/024* (2013.01); *H04B 7/0456* (2013.01); *H04L 5/0035* (2013.01)

(58) Field of Classification Search
CPC .... H04B 7/0417; H04B 7/0456; H04B 7/024; H04L 5/0035
See application file for complete search history.

(56) References Cited

U.S. PATENT DOCUMENTS

| 2014/0056205 | A1 | 2/2014 | Aboul-Magd et al. |
| 2014/0328242 | A1* | 11/2014 | Tong ..................... H04W 48/00 370/312 |
| 2015/0295629 | A1* | 10/2015 | Xia ....................... H04B 7/0491 370/329 |

(Continued)

FOREIGN PATENT DOCUMENTS

WO  WO-2014066785 A1  5/2014

OTHER PUBLICATIONS

International Search Report and Written Opinion—PCT/US2018/050119—ISA/EPO—dated Nov. 23, 2018.

*Primary Examiner* — Syed Haider
(74) *Attorney, Agent, or Firm* — Steven R. Thiel; Paradice and Li LLP

(57) ABSTRACT

One aspect includes a method of establishing, via a first access point, a distributed MIMO joint transmission opportunity with one or more second access points to one or more stations. The method comprises generating, via a processor, a first message for transmission to the stations and the second access points. The first message indicates a null data packet transmission and the stations configured to receive a stream during the joint transmission opportunity. The method also comprises transmitting the first message to the second access points and the stations. The method further comprises generating, via the processor, a reference phase signal for transmission to the second access points.

17 Claims, 13 Drawing Sheets

(56) References Cited

U.S. PATENT DOCUMENTS

2016/0143026 A1\* 5/2016 Seok ................ H04W 72/0413
 370/329
2016/0165630 A1\* 6/2016 Oteri .................... H04W 74/04
 370/336

\* cited by examiner

METHODS AND SYSTEMS FOR JOINT ACCESS POINT MIMO TRANSMISSIONS

CROSS REFERENCE TO RELATED APPLICATION(S)

This application claims the benefit of U.S. Provisional Application No. 62/556,096 titled "METHODS AND SYSTEMS FOR JOINT ACCESS POINT MIMO TRANSMISSIONS," filed Sep. 8, 2017. The content of this prior application is considered part of this application and is hereby incorporated by reference in its entirety.

TECHNICAL FIELD

This application relates generally to wireless communication, and more specifically to systems and methods for clustering and coordinating access points for distributed MIMO communication.

BACKGROUND

Wireless communications systems are widely deployed to provide various types of communication content such as voice, video, packet data, messaging, broadcast, and so on. The wireless communications systems may utilize communications networks to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wi-Fi or Wi-Fi (e.g., IEEE 802.11) is a technology that allows electronic devices to connect to the WLAN. A Wi-Fi network may include an access point (AP) that may communicate with one or more other electronic devices (e.g., computers, cellular phones, tablets, laptops, televisions, wireless devices, mobile devices, "smart" devices, etc.), which can be referred to as stations (STAs). The AP may be coupled to a network, such as the Internet, and may enable one or more STAs to communicate via the network or with other STAs coupled to the AP. Wireless networks are often preferred when the network elements (e.g., APs or STAs) are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Many wireless networks utilize carrier-sense multiple access with collision detection (CSMA/CD) to share a wireless medium. With CSMA/CD, before transmission of data on the wireless medium, a device may listen to the medium to determine whether another transmission is in progress. If the medium is idle, the device may attempt a transmission. The device may also listen to the medium during its transmission, so as to detect whether the data was successfully transmitted, or if perhaps a collision with a transmission of another device occurred. When a collision is detected, the device may wait for a period of time and then re-attempt the transmission. The use of CSMA/CD allows for a single device to utilize a particular channel (such as a spatial or frequency division multiplexing channel) of a wireless network.

Users continue to demand greater and greater capacity from their wireless networks. For example, video streaming over wireless networks is becoming more common. Video teleconferencing may also place additional capacity demands on wireless networks. In order to satisfy the bandwidth and capacity requirements users require, improvements in the ability of a wireless medium to carry and communicate larger and larger amounts of data are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect includes a method of wireless communication. The method comprises generating a first message, the first message identifying one or more first devices for receiving one or more streams to be transmitted during a transmission opportunity, simultaneously from a second device and one or more third devices; and outputting the first message for transmission.

Another aspect includes an apparatus for wireless communication. The apparatus comprises a processing system configured to generate a first message, the first message identifying one or more first devices for receiving one or more streams to be transmitted during a transmission opportunity, simultaneously from a second device and one or more third devices; and an interface for outputting the first message for transmission.

Another aspect includes an apparatus for wireless transmission. The apparatus comprises means for generating a first message, the first message identifying one or more first devices for receiving one or more streams to be transmitted during a transmission opportunity, simultaneously from a second device and one or more third devices; and means for outputting the first message for transmission.

Another aspect includes an access point that comprises a processing system configured to generate a first message for transmission, the first message identifying one or more first devices for receiving one or more streams to be transmitted during a transmission opportunity, simultaneously from a second device and one or more third devices; and a transmitter configured to transmit the first message.

Another aspect includes a method of establishing, via a first access point, a distributed MIMO joint transmission opportunity with one or more second access points to one or more stations. The method comprises generating, via a processor, a first message for transmission to the stations and the second access points. The first message indicates a null data packet transmission and the stations configured to receive a stream during the joint transmission opportunity. The method also comprises transmitting the first message to the second access points and the stations. The method further comprises generating, via the processor, a reference phase signal for transmission to the second access points.

Another aspect includes an apparatus for establishing a distributed MIMO joint transmission opportunity with one or more stations. The apparatus comprises a processor and a transmit circuit. The processor is configured to generate a first message for transmission to the stations and one or more access points. The first message indicates a null data packet transmission and the stations configured to receive a stream during the joint transmission opportunity. The processor is also configured to generate a reference phase signal for transmission to the access points. The transmit circuit is configured to transmit the first message to the access points and the stations.

An additional aspect includes an apparatus for establishing a distributed MIMO joint transmission opportunity with one or more stations. The apparatus comprises means for generating a first message for transmission to the stations and one or more access points. The first message indicates a null data packet transmission and the stations configured to receive a stream during the joint transmission opportunity. The apparatus also comprises means for transmitting the first message to the access points and the stations. The apparatus further comprises means for generating a reference phase signal for transmission to the access points.

Another aspect includes a computer readable medium comprising instructions that cause a processing system to process a method of wireless communication. The method comprises generating a first message for transmission, the first message identifying one or more first devices for receiving one or more streams to be transmitted during a transmission opportunity, simultaneously from a second device and one or more third devices; and outputting the first message for transmission.

DETAILED DESCRIPTION

Figure 1:
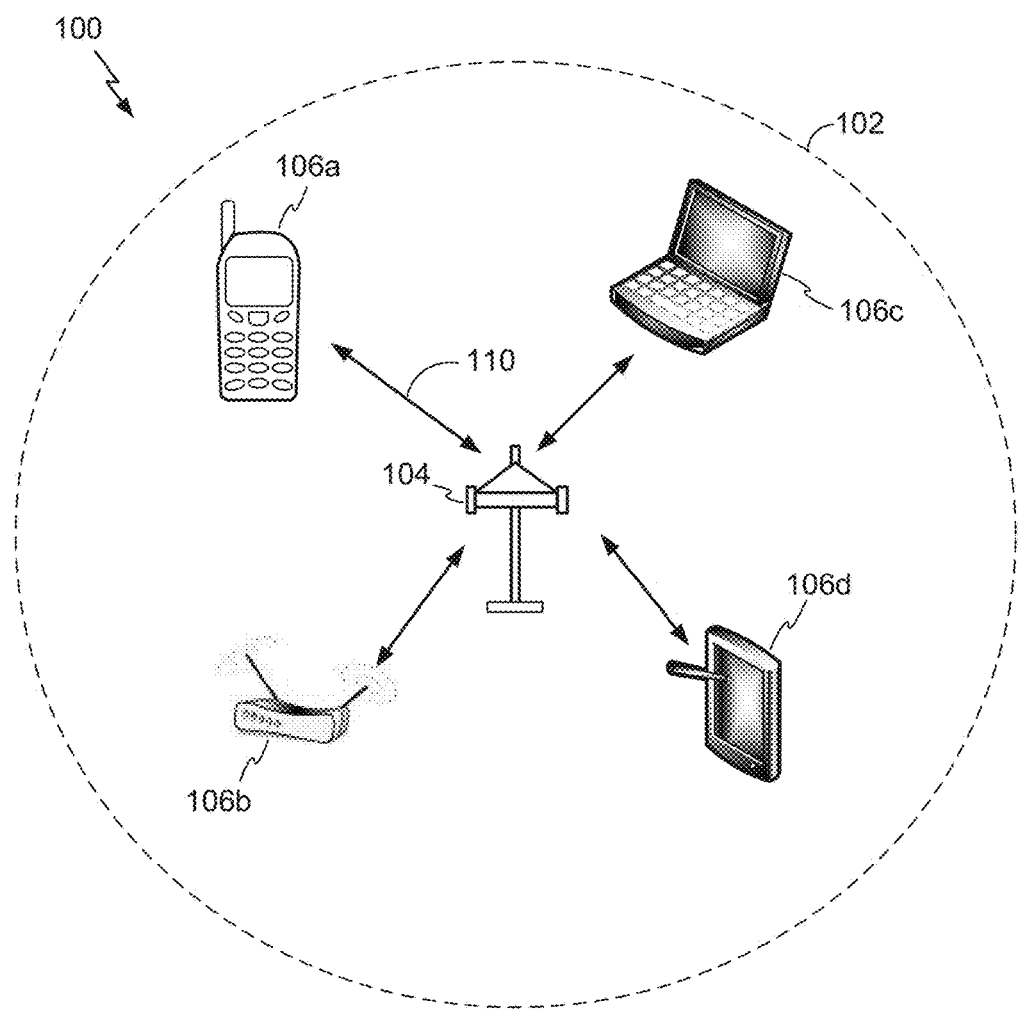
FIG. 1 schematically illustrates an example wireless communication system in which aspects of the present disclosure may be employed.

Various aspects of the novel systems, apparatuses, and methods are described more fully hereinafter with reference to the accompanying drawings. The teachings of the disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points (also referred to as "APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations an STA may also be used as an AP.

An AP may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A STA may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Spatial Division Multiple Access (SDMA), Time Division Multiple Access (TDMA) networks, Frequency Division Multiple Access (FDMA) networks, Orthogonal FDMA (OFDMA) networks, Single-Carrier FDMA (SC-FDMA) networks, and so forth. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. An SDMA system may utilize sufficiently different directions to simultaneously transmit data belonging to multiple user terminals. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

FIG. 1 is a diagram that illustrates a multiple-access multiple-input multiple-output (MIMO) system 100 with AP 104 and STAs 106a-d. For simplicity, only one AP 104 is shown in FIG. 1. However, the multiple-access MIMO system 100 is not limited to a single AP 104 and may include a plurality of APs 104.

As described above, the AP 104 communicates with the STAs 106a-d (also referred to herein collectively as "the STAs 106" or individually as "the STA 106"). The STA 106 may also be referred to as a base station or using some other terminology. Also as described above, the STA 106 may be fixed or mobile and may also be referred to as a user terminal, a mobile station, a wireless device, or using some other terminology.

The AP 104 may communicate with one or more STAs 106 at any given moment via communication link 110. The communication link 110 can be bidirectional. For example, the communication link 110 can include a downlink (DL) and an uplink (UL). The downlink facilitates transmission from the AP 104 to one or more of the STAs 106. The uplink facilitates transmission from one or more of the STAs 106 to the AP 104.

Alternatively, the downlink of the communication link 110 may be referred to as a forward link or a forward channel, and the uplink of the communication link 110 may be referred to as a reverse link or a reverse channel. A STA 106 may in addition to, or alternatively, communicate peer-to-peer with another STA 106.

The AP 104 may act as a base station and provide wireless communication coverage in a basic service area (BSA). The AP 104 along with the STAs 106 associated with the AP 104 and that use the AP 104 for communication may be referred to as a basic service set (BSS) 102. It should be noted that the wireless communication system 100 may not have a central AP 104, but rather may function as a peer-to-peer network (e.g. TDLS, WiFi-Direct) between the STAs 106. Accordingly, the functions of the AP 104 described herein may alternatively be performed by one or more of the STAs 106.

Portions of the following disclosure will describe STAs 106 capable of communicating via any of the communication networks described above (e.g., SDMA). Thus, for such aspects, the AP 104 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

The MIMO system 100 may employ multiple transmit and multiple receive antennas for data transmission on the downlink and/or the uplink of the communication link 110. For example, the AP 104 may be equipped with N antennas and represents the multiple-input (MI) for downlink transmissions and the multiple-output (MO) for uplink transmissions. A set of K selected STAs 106 collectively represents the multiple-output for downlink transmissions and the multiple-input for uplink transmissions. For pure SDMA, it may be desired to have $N \geq K \geq 1$ if the data symbol streams for the K STAs 106 are not multiplexed in code, frequency or time by some means. K may be greater than N if the data symbol streams can be multiplexed using TDMA technique, different code channels with CDMA, disjoint sets of sub-bands with OFDM, and so on. Each selected STA 106 may transmit user-specific data to and/or receive user-specific data from the AP 104. In general, each selected STA 106 may be equipped with one or multiple antennas (i.e., $M \geq 1$). The K selected STAs 106 can have the same number of antennas, or one or more STAs 106 may have a different number of antennas than other STAs 106 or the AP 104.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA 106 may be equipped with a single antenna (e.g., in order to keep costs down) or multiple antennas (e.g., where the additional cost can be supported). The MIMO system 100 may also be a TDMA system if the STAs 106 share the same frequency channel by dividing transmission/reception into different time slots, where each time slot may be assigned to a different STA 106.

Figure 2:
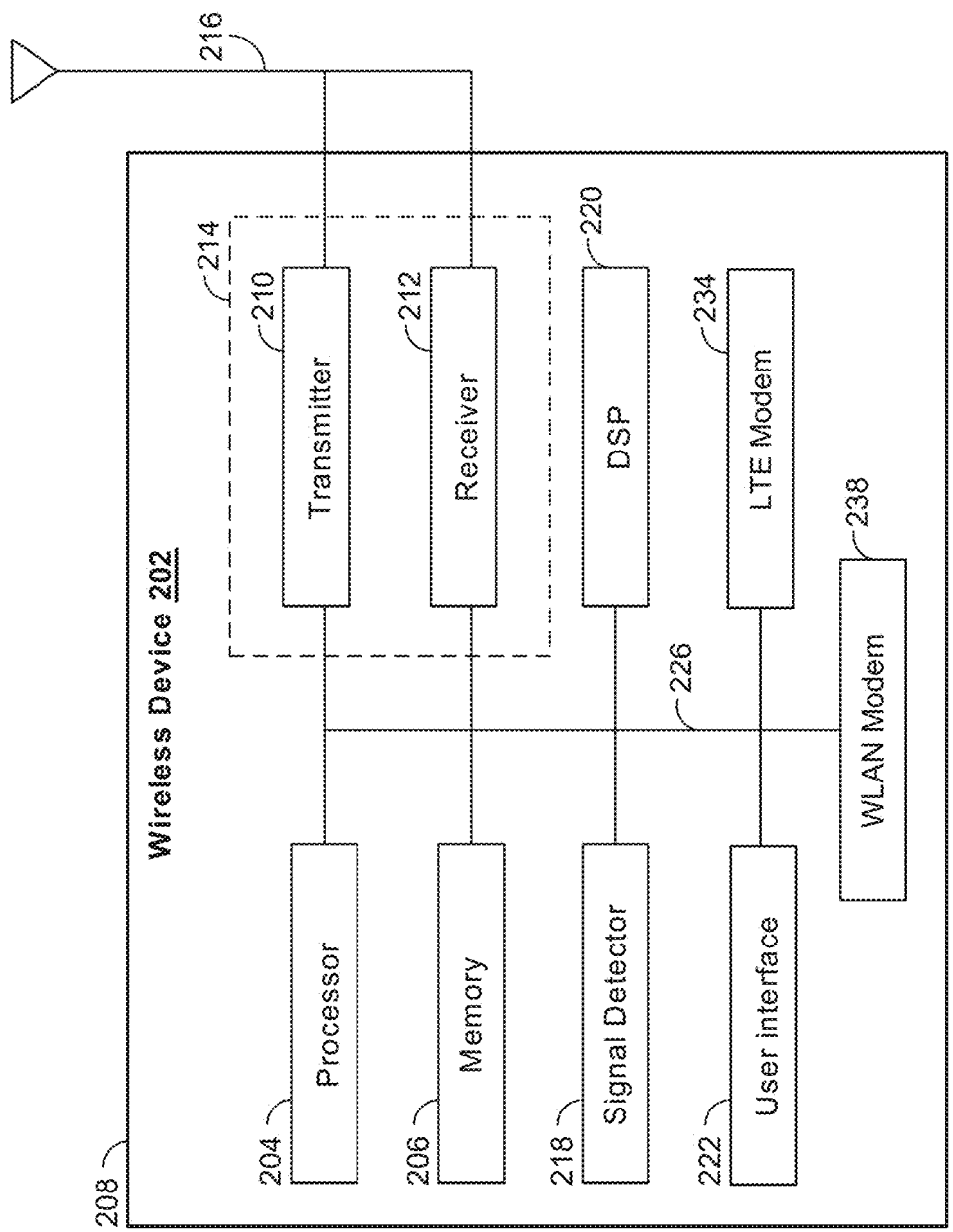
FIG. 2 schematically illustrates an example wireless device that may be employed within the example wireless communication system of FIG. 1.

FIG. 2 illustrates various components that may be utilized in a wireless device 202 that may be employed within the wireless communication system 100. The wireless device 202 is an example of a device that may be configured to implement the various methods described herein. The wireless device 202 may implement one or both of the AP 104 or the STA 106.

The wireless device 202 may include an electronic hardware processor (also referred to as a "processor") 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more electronic hardware processors. The various illustrative logical blocks, modules, and circuits described in connection with the aspects disclosed herein may be implemented within or performed by the processing system, an integrated circuit ("IC"), an access terminal, the wireless device 202, or an access point. The processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The wireless device 202 may also include a housing 208 that may include a transmitter 210 and a receiver 212 to allow transmission and reception of data between the wireless device 202 and a remote location and/or device. The transmitter 210 and receiver 212 may be combined into a transceiver 214. A single or a plurality of transceiver antennas 216 may be attached to the housing 208 and electrically coupled to the transceiver 214. The wireless device 202 may also include multiple transmitters, multiple receivers, and multiple transceivers as understood by a person having ordinary skill in the art.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals.

The wireless device 202 may also include a digital signal processor (DSP) 220 for use in processing signals. In some aspects, the wireless device may also include one or more of a user interface component 222, cellular modem 234, and a wireless LAN (WLAN) modem 238. The cellular modem 234 may provide for communication using cellular technologies, such as CDMA, GPRS, GSM, UTMS, or other cellular networking technology. The WLAN modem 238 may provide for communications using one or more WiFi technologies, such as any of the IEEE 802.11 protocol standards.

The various components of the wireless device 202 may be coupled together by a bus 226, which may include a power bus, a control signal bus, and a status signal bus in addition to a data bus.

In certain embodiments, at least the processor 204 and/or the bus 226 of the wireless device 202 comprises an interface. As used herein, the term interface may refer to hardware or software configured to connect two or more components of the wireless device 202 together. For example, an interface may be a part of the processor 204 or the bus 226 and may be configured to allow communication of information or data between two or more components of the wireless device 202. The interface may be integrated into a chip or other device. For example, in some embodiments, an interface may comprise at least a portion of the receiver 212 configured to receive information or communications from a device such as the antenna 216 or another device. The interface (e.g., of the processor 204 or the bus 226) may receive information or data processed by a front end of the wireless device 202 or another device or may process information received. In some embodiments, the interface may comprise the transmitter 210 configured to transmit or communicate information or data to the antenna 216 or another device. Thus, the interface may transmit information or data or may prepare information or data for outputting for transmission (e.g., via the bus 226).

Certain aspects of the present disclosure support transmitting the UL signal or the DL signal between one or more of the STAs 106 and the AP 104. In some embodiments, the signals may be transmitted in a multi-user MIMO (MU-MIMO) system. Alternatively, the signals may be transmitted in a multi-user FDMA (MU-FDMA) or similar FDMA system.

Figure 3:
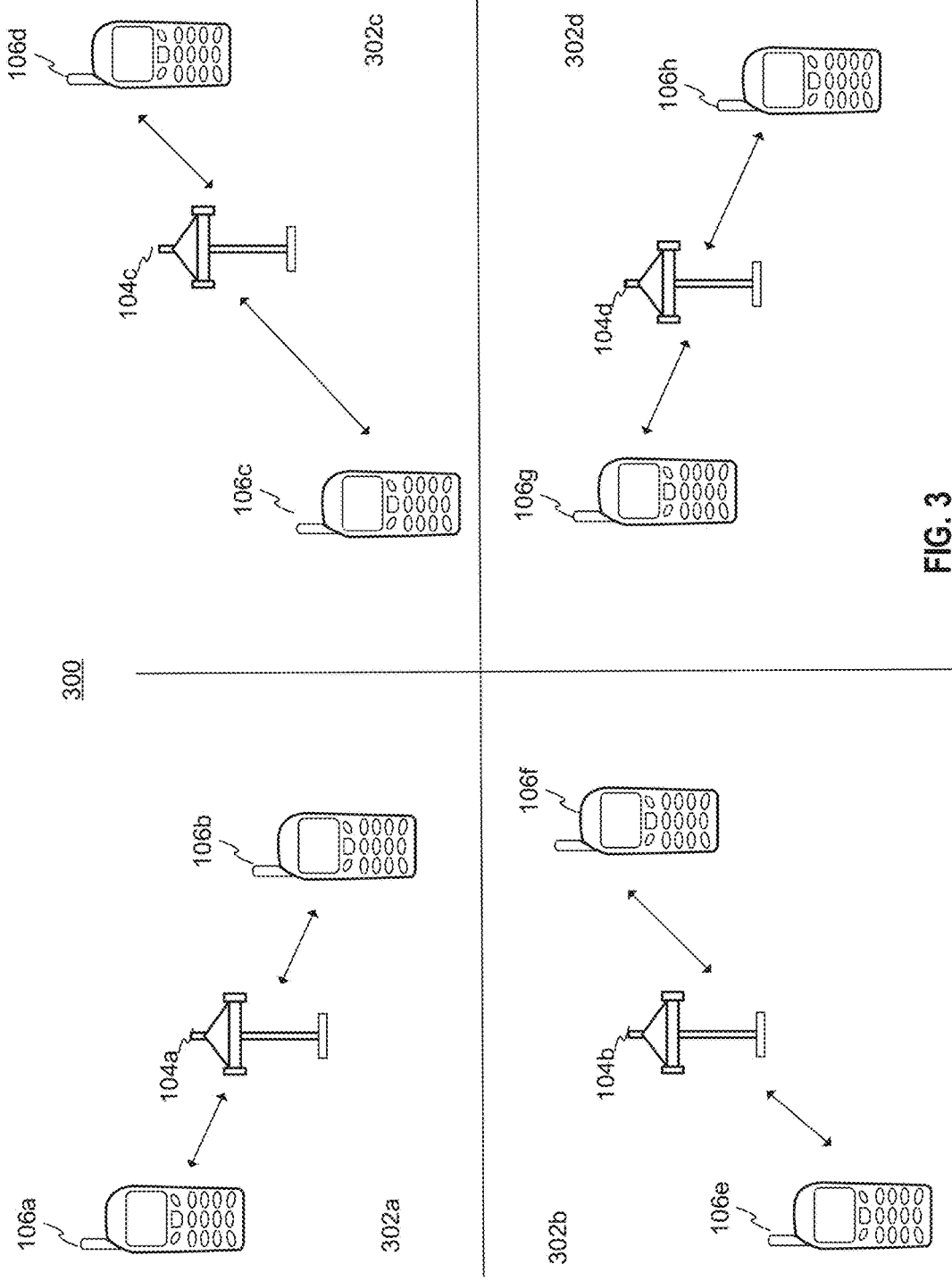
FIG. 3 schematically illustrates an example configuration of a distributed multiple-access multiple-input multiple-output (MIMO) wireless communication system in accordance with certain embodiments described herein.

FIG. 3 shows four basic service sets (BSSs) 302a-d of communication system 300. Each BSS includes an access point 104a-d, respectively. Each access point 104a-d is associated with at least two stations within its respective BSS 302a-d. AP 104a is associated with STA 106a-b. AP 104b is associated with STA 106c-d. AP 104c is associated with STA 106e-f. AP 104d is associated with STAs 106g-h. An AP 104 that is associated with a STA 106 may be referred to as a BSS AP for the STA throughout this disclosure. Similarly, an AP 104 for which there is no association with a particular STA 106 may be referred to as an OBSS AP for the STA throughout this disclosure. Associations between an AP 104 and one or more STAs 106 provides for, in part, coordination of communication between devices within the basic service set (BSS) defined by the AP 104 and its associated STAs 106. For example, devices within each BSS may exchange signals with each other. The signals may function to coordinate transmissions from the respective AP 104a-d and stations within the AP's BSS 302a-d.

The devices shown in FIG. 3, including the AP's 104a-d and STA 106a-h, also share a wireless medium. Sharing of the wireless medium is facilitated, in some aspects, via the use of carrier sense media access with collision detection (CSMA/CD). The disclosed embodiments may provide for a modified version of CSMA/CD that provides for an increase in an ability for the BSSs 302a-d to communicate simultaneously when compared to known systems.

The stations 106a-h within the BSSs 302a-d may have different abilities to receive transmissions from their associated AP based, at least in part, on their position relative to the other APs 104 and/or STAs 106 outside their respective BSS (OBSS). For example, because the stations 106a, 106d, 106e, and 106h are positioned relatively far from OBSS APs 104, these stations may have an ability to receive transmissions from their respective BSS AP 104 even when an OBSS AP 104 or STA 106 is transmitting. Stations having such receive characteristics may be referred to as reuse STAs throughout this disclosure. Reuse STAs may have sufficient signal to noise ratios (SINRs) with OBSS APs 104 that they may communicate with other STAs 106 and/or APs 104 without having to be nulled.

In contrast, STAs 106b, 106c, 106f, and 106g are illustrated in positions that are relatively close to an OBSS AP 104. Thus, these stations may have less ability to receive transmissions from their BSS AP 104 during transmissions from OBSS APs 104 and/or OBSS STAs 106 due to interference. Stations having such receive characteristics may be referred to as non-reuse or edge STAs 106 throughout this disclosure.

Non-reuse STAs may have insufficient signal to noise ratios (SINRs) with OBSS APs 104 requiring that they be nulled in order to communicate with other STAs 106 and/or APs 104 while communications are occurring involving the OBSS APs 104. In some aspects, the disclosed methods and systems may provide for an improved ability for the non-reuse STAs 106 to communicate concurrently while other OBSS devices, such as other APs and STAs, are also communicating on the wireless medium.

Figure 4:
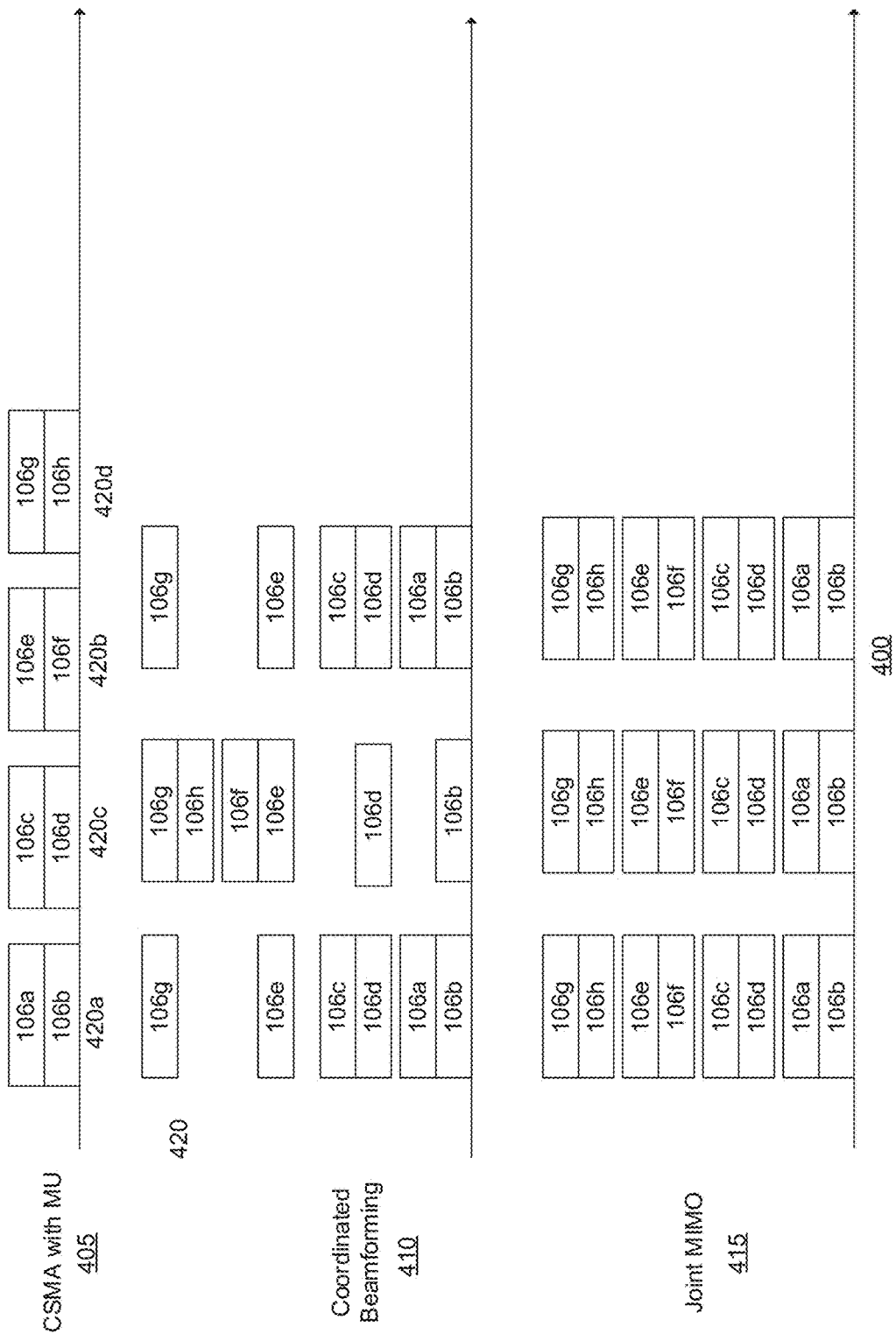
FIG. 4 schematically illustrates example communication options compatible with a distributed MIMO wireless communication system in accordance with certain embodiments described herein.

FIG. 4 shows three exemplary approaches 400 to arbitrating the wireless medium with the communication system 300 of FIG. 3. Approach 405 utilizes carrier sense media access (CSMA) to perform single BSS multi-user transmissions. For example, each of transmissions 420a-d may be performed by the BSSs 302a, 302c, 302b, 302d of FIG. 3 respectively. The use of traditional CSMA in approach 405 causes the medium to be utilized by only one BSS 302 at any point in time.

Approach 410 utilizes coordinated beamforming (COBF). With the coordinated beamforming approach 410, the APs 104a-d may coordinate transmissions between their respective BSSs 302a-d. In some aspects, this coordination may be performed over the wireless medium, or in some aspects, over a back-haul network. In these aspects, the coordination traffic over the backhaul network provided for improved utilization of the wireless medium.

With this approach, reuse STAs 106a, 106d, 106e, and 106h for different BSSs may be scheduled to transmit or receive data concurrently. For example, a relative strength of a communication channel between STA 106a and AP 104a may allow these two devices to exchange data simultaneously with communication with OBSS devices, such as, for example, AP 104b and STA 106d.

In addition, approach 410 allows for non-reuse STAs 106b, 106c, 106f, and 106g to be scheduled for transmission concurrently with OBSS devices. For example, STA 106b, which is within BSS 302a, may be scheduled to communicate simultaneous with communication between AP 104d and STA 106h of BSS 302d. Such simultaneous communication between a non-reuse STA (such as STA 106b) and, for example, AP 104d may be facilitated by scheduling AP 104d to transmit a signal to STA 106b simultaneous with AP 104d's transmission to STA 106h. For example, AP 104d may transmit a null signal for dominant interfering signals to STA 106b. Thus, while transmitting a first signal to STA 106h, AP 104d may simultaneously transmit a signal nulling the first signal to STA 106b. Such simultaneous transmission by the AP 104d may be provided by selecting individual antenna(s) of a plurality of antennas provided by AP 104d for each of the transmissions. Such nulling may create reuse opportunities for otherwise non-reuse STAs. COBF may operate in both DL and UL directions with the APs 104 nulling respective frequencies.

Approach 415 shows an exemplary joint multi-user communication or a distributed MIMO communication across APs 104*a-d* within the BSSs 302*a-d* of FIG. 3. With this joint MIMO approach 415, multiple APs 104, such as a cluster of APs 104*a-d*, may service N 1-SS STAs simultaneously, where N is ~¾ of a total number of antennas across all APs within the cluster.

Distributed MIMO communications may coordinate a collection of antennas across the multiple APs 104 within a cluster to transmit to stations 106 within the cluster. Thus, while traditional MIMO methods allocate transmit antennas within a single BSS to stations within the BSS, distributed MIMO provides for allocation of transmit antennas outside a BSS to facilitate communications with stations within the BSS.

In a distributed MIMO communication, a station in one BSS may communicate with one or more access points in another, different BSS. Thus, for example, station 106*a* of BSS 302*a* of FIG. 3 may communicate with access point 104*d*, which is in BSS 302*d*. This communication may occur simultaneously with communication between STA 106*a* and AP 104*a*, the BSS AP of the STA 106*a*. In some aspects of an uplink distributed MIMO communication, the STA 106*a* may conduct one or more uplink communications to AP 104*a* simultaneously with AP 104*d*. Alternatively, a downlink distributed MIMO communication may include AP 104*a* transmitting data to STA 106*a* simultaneously with a transmission from AP 104*d* to STA 106*a*.

Thus, one or more of the distributed embodiments may utilize MIMO in the form of Cooperative Multipoint (CoMP, also referred to as e.g. Network MIMO (N-MIMO), Distributed MIMO (D-MIMO), or Cooperative MIMO (Co-MIMO), etc) transmission, in which multiple access points maintaining multiple corresponding basic service sets, can conduct respective cooperative or joint communications with one or more STAs 106. CoMP communication between STAs and APs can utilize for example, a joint processing scheme, in which an access point associated with a station (a BSS AP) and an access point that is not associated with a station (a OBSS AP) cooperate to engage in transmitting downlink data to the STA and/or jointly receiving uplink data from the STA. Additionally or alternatively, CoMP communication between an STA and multiple access points can utilize coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 410 or the joint MIMO approach 415, an understanding of channel conditions between an access point and OBSS devices may provide for greater wireless communication efficiency.

Figure 5:
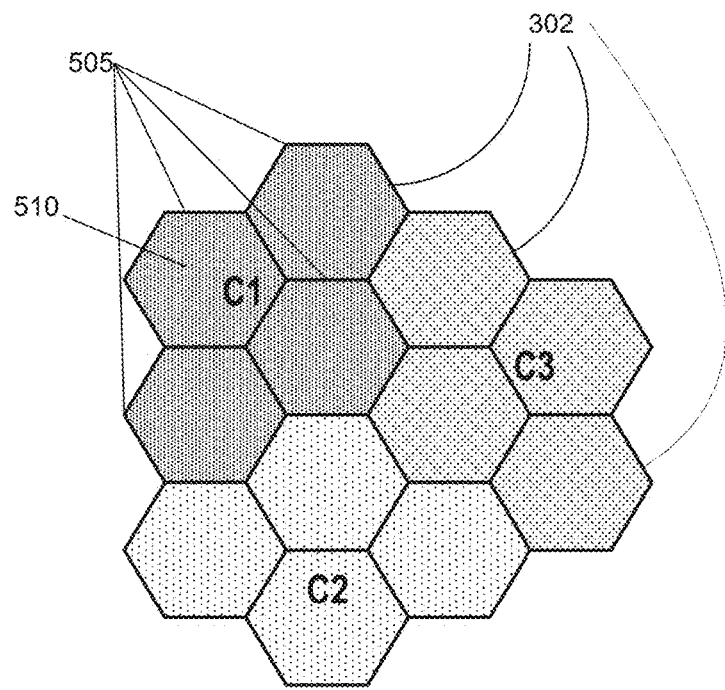
FIG. 5 schematically illustrates a plurality of basic service sets (BSSs) of an exemplary distributed MIMO wireless communication system.

FIG. 5 schematically illustrates a plurality of basic service sets (BSSs) 302 of an exemplary distributed MIMO wireless communication system. Each hexagon of FIG. 5 represents an access point and associated stations, collectively referred to as a basic service set (BSS) 302 such as described with respect to FIG. 3. The individual BSSs 302 are grouped into clusters, (C1), (C2), and (C3) in accordance with certain embodiments described herein.

In the example schematically illustrated by FIG. 5, a first cluster (C1) comprises four BSSs 302, a second cluster (C2) comprises four BSSs 302, and a third cluster (C3) comprises four BSSs 302. In certain other embodiments, a cluster can comprise 2, 3, 4, 5, or any numbers of BSSs 302 and a wireless communication system can comprise one or more clusters (e.g., 2, 3, 4, 5 or other numbers of clusters).

In at least some of the disclosed aspects, two or more of the APs 104*a-d* from FIG. 3 may negotiate to form a cluster or a portion of a cluster, such as clusters (C1), (C2), and (C3) illustrated in FIG. 5. In certain embodiments, the cluster (C1) comprises BSSs 302*a-d*. In other aspects, cluster configurations may be defined via manual configuration. For example, each AP 104 may maintain configuration parameters indicating whether the AP 104 is part of one or more clusters (C1), (C2), and (C3), and if so, a cluster identifier for the cluster (C1), (C2), and (C3). In some aspects, the configuration may also indicate whether the AP 104 is a controller 510 for the cluster (C1), (C2), and (C3). For example, in certain embodiments, the AP 104*a* of the BSS 302*a* of cluster (C1) is configured as the controller 510 of cluster (C1).

In some of the embodiments disclosed herein, the controller 510 may take on functions that differ from APs 104 that are part of the cluster (C1) but are not the controller 510. Thus, in some aspects, two or more of APs 104*a-d* may be included in the same cluster (C1), (C2), and (C3). STAs 106 associated with those APs 104 may also be considered to be included in or part of the cluster (C1), (C2), and (C3) of their associated AP 104. Therefore, in some aspects the STAs 106*a-h* illustrated above may be part of the same cluster (C1), (C2), and (C3).

The cluster (C1), (C2), and (C3) of APs 104 may coordinate transmissions between themselves and their associated APs 104. In some aspects, the cluster (C1), (C2), and (C3) may be identified via a cluster identifier value or number that uniquely identifies the group of APs 104 comprising the cluster (C1), (C2), and (C3). In some aspects, during association of a STA 106 with any of the APs 104 in the cluster (C1), (C2), and (C3), the cluster identifier value is transmitted to the STA 106 during association, for example, in an association response message. The STA 106 may then utilize the cluster identifier value to coordinate communications within the cluster (C1), (C2), and (C3). For example, one or more messages transmitted over the wireless network may include the cluster identifier value, which a receiving STA 106 may use to determine whether or not the message is addressed to the STA 106.

In some embodiments, the cluster (C1), (C2), and (C3) of APs 104 may also utilize various methods to identify STAs 106 within the cluster (C1), (C2), and (C3). For example, as known methods of generating association identifiers (AIDs) may not provide uniqueness across APs 104, in some aspects, media access control (MAC) addresses may be utilized to identify STAs 106 where appropriate. For example, known messages including user info fields that utilize association identifiers to identify STAs 106 may be modified to contain data derived from station MAC addresses in the disclosed embodiments. Alternatively, methods of generating association identifiers may be modified to ensure uniqueness within a cluster (C1), (C2), and (C3) of APs 104. For example, a portion of the association identifier may uniquely identify an AP 104 within the cluster (C1), (C2), and (C3). Stations associated with that access point 104 would be assigned association identifiers including the unique identification. This provides unique association identifiers across access points within a cluster (C1), (C2), and (C3). In some other aspects, an association identifier within a cluster (C1), (C2), and (C3) may include the cluster identifier. This may provide for uniqueness across clusters to facilitate future cross-cluster coordination of communication.

In certain embodiments, to perform distributed MIMO communications, devices within two or more BSSs 302 of a cluster (C1), (C2), and (C3) may transmit over a single channel simultaneously (e.g., transmit data from a plurality of APs 104 of the BSS simultaneously via the single channel, or transmit data from a plurality of stations in different BSSs simultaneously to a single AP). In some aspects, a centralized scheduler may coordinate transmissions across the clusters (C1), (C2), and (C3). For example, coordination may include selecting which devices will transmit simultaneously from multiple BSSs to perform a joint MIMO communication.

Under European Telecommunications Standard Institute (ETSI) regulations, wireless communication systems are generally required to utilize clear channel assessment (CCA) or listen-before-talk (LBT) before allowing access to the wireless network. Generally, two different access modes are allowed in such wireless communication systems: "frame-based" access mode and "load-based" access mode. To utilize coordinated access in an unlicensed spectrum, it is generally desirable for a device on the wireless network to use a safe or allowed mechanism for ignoring same-network deferral while honoring LBT toward other devices on the wireless network. A similar issue arises with licensed assisted access (LAA) systems, which are bound to a fixed frame structure. However, in wireless communication systems which are not bound to a fixed frame structure (e.g., WiFi), a more flexible and/or efficient solution may be used. Certain embodiments described herein advantageously provide a way to enable reuse (e.g., stations able to serve simultaneously without having to be nulled) by synchronizing the physical layer convergence procedure (PLCP) protocol data unit (PPDU) start time, which may be seen as a forced collision. In certain such embodiments, the timing scheme is configured so that energy detect (ED) or power detect (PD) operations do not trigger within the same wireless network at the start of a frame (e.g., having a standard that defines requirements for CCA timing and synchronization).

Figure 6:
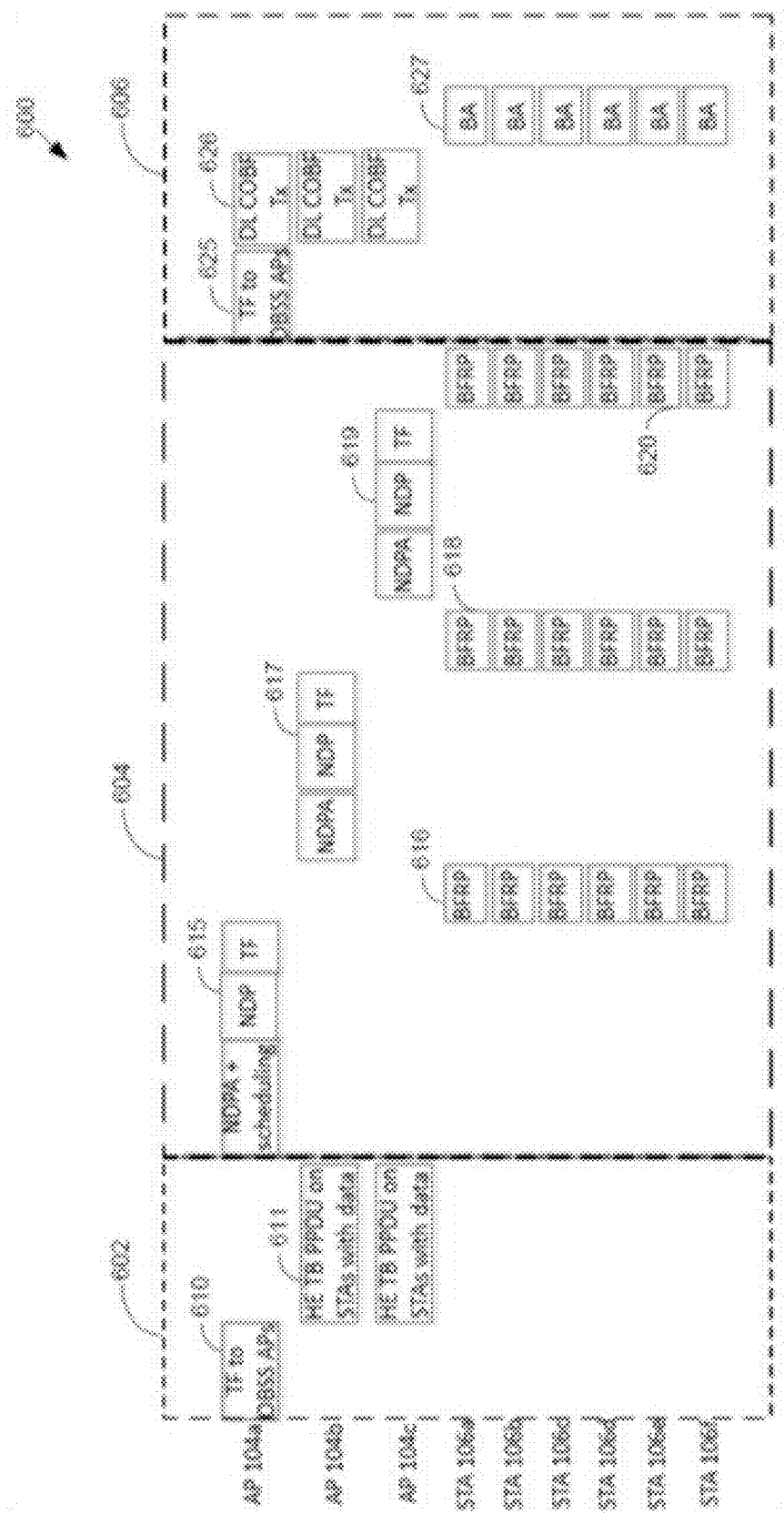
FIG. 6 schematically illustrates an exemplary communication option in a downlink coordinated beamforming (COBF) transmission opportunity of the distributed MIMO wireless communication system of FIG. 4.

FIG. 6 schematically illustrates an exemplary communication option in a downlink coordinated beamforming (COBF) transmission opportunity 600 of the distributed MIMO wireless communication system 400 of FIG. 4. The transmission opportunity 600 may comprise three different phases during which one or more APs 104 may communicate with each other and with corresponding STAs 106 of their BSSs 302a-d. Each of the APs 104 of the BSSs 302a-d may apply for or request control of transmissions within the wireless communication system 400. A winning AP 104 may then have control over the transmission opportunity 600 as shown in FIG. 6. In some embodiments, the winning AP may be AP 104a. After the AP 104a wins control of the transmission opportunity 600, the AP 104a may initiate DL COBF transmissions in the obtained transmission opportunity 600 over three phases. While the transmission opportunity 600 relates to DL COBF transmissions, the discussions herein may pertain to any type of communication that may occur in transmission opportunities.

A first phase 602 may correspond to a candidate STA identification period. During the first phase 602, the winning AP (e.g., AP 104a) may poll OBSS APs 104 (e.g., the APs for other BSSs 302 than the AP 104a) for their candidate STAs 106 having buffered DL data. Based on the received information and/or identifications, the winning AP, AP 104a, may determine which STAs 106 are to be scheduled for communication during the transmission opportunity 600. A second phase 604 may correspond to a multi-BSS 302 sounding period. During the second phase 604, the winning AP 104a may coordinate a multi-BSS 302 sounding during which each collaborating AP 104 (e.g., each of the APs 104 that intend to communicate during the transmission opportunity 600) identifies scheduled BSS STAs 106 and OBSS non-reuse STAs 106. For example, this may comprise signal strength or other metrics (e.g., beacon RSSI of APs 104) for communications between APs 104 and STAs 106. A third phase 606 may correspond to a DL COBF transmission period. During the third phase 606, each of the collaborating APs 104 may simultaneously begin DL COBF transmissions for their scheduled BSS STAs 106 while nulling OBSS non-reuse STAs 106. For example, with reference to FIG. 3, AP 104c may transmit DL COBF transmissions to STAs 106c and 106d while nulling OBSS non-reuse STAs 106b, 106f, and 106g. APs 104a, 104b, and 104d may operate similarly. In some embodiments, the first phase 602 and the second phase 604 may not be required if the APs 104 already have knowledge of candidate STAs 106 having DL data buffered and/or when details of the metrics of communications between APs 104 and STAs 106 are known.

During the first phase 602, the AP 104a may transmit a trigger message or frame 610 directed to OBSS APs 104 (e.g., APs 104b-104d). In some embodiments, the AP 104a may transmit the trigger frame 610 to only selected APs 104. The trigger frame 610 may be transmitted to OBSS APs 104 to determine the candidate STAs 106 that exist for each of the APs 104 that receive the trigger frame 610. The candidate STAs 106 may comprise STAs to which data will be transmitted during the transmission opportunity 600. In the trigger frame 610, the AP 104a may indicate which one or more OBSS APs 104 are selected for participation in the transmission opportunity 600 (e.g., AP 104b and AP 104c). In some embodiments, the trigger frame 610 also includes identification of non-reuse STAs 106 of the AP 104a BSS 302a (e.g., STA 106b). In some embodiments, the trigger frame 610 also includes identification of dimensions of AP 104a that remain after scheduling the non-reuse and reuse STAs of the AP 104a.

Also during the first phase 602, the APs 104b and 104c may transmit their respective reports 611 back to the AP 104a in the form of high efficiency trigger based PPDUs. In some embodiments, these reports 611 indicate candidate non-reuse STAs 106 for each of the APs 104b and 104c. In some embodiments, a total number of spatial streams (NSSs) of each of the APs 104b and 104c does not exceed the remaining dimensions of the AP 104a.

After receiving the reports 611, the AP 104a may determine a schedule for the STAs 106 that will receive transmissions during the transmission opportunity 600. In some embodiments, the AP 104a may first schedule non-reuse and reuse STAs 106 that belong to the BSS 302a with the AP 104a. Once the STAs 106 of the BSS 302a are scheduled, the AP 104a may sequentially add OBSS non-reuse STAs 106 if a total required dimension of scheduled STAs 106 is less than a total dimension of the APs 104a-c. This may assume that each non-reuse STA costs one (1) dimension for each AP 104a-c.

During the second phase 604, the AP 104a may transmit a null data packet announcement (NDPA) and scheduling frame along with a null data packet and trigger frame in a communication 615 to the selected OBSS APs 104b-c. The NDPA and scheduling frame of the communication 615 may indicate scheduled non-reuse STAs 106 of all APs 104a-c and NDPA start times for each OBSS AP 104b-c. In some embodiments, the communication 615 may be transmitted to the STAs 106 and the STAs 106 may each transmit a beamforming report (BFRP) frame 616 to the AP 104a in response to the communication 615. Also during the second phase 604, the AP 104b may transmit a NDPA, a null data packet (NDP), and a trigger frame in a communication 617. Similarly, the AP 104c may transmit a NDPA, a NDP, and a trigger frame in a communication 619. The communications 617 and 619 may allow each AP 104b and 104c to schedule and solicit BFRP frames from all non-reuse STAs 106 and reuse STAs 106 that belong to the BSS 302 of the AP 104. Each of the STAs 106 may respond with BFRP frames 618 to the communication 617 and BFRP frames 620 to the communication 619.

During the third phase 606, the AP 104a sends a trigger frame 625 to OBSS APs 104b and 104c. The trigger frame 625 may indicate an initiation of DL COBF transmissions. Once the trigger frame 625 is transmitted by the AP 104a and once the OBSS APs 104b and 104c receive the trigger frame 625, each of the APs 104a-c may transmit their DL COBF transmissions 626 to their respective scheduled non-reuse STAs 106 while simultaneously nulling the OBSS non-reuse STAs 106. In some embodiments, each AP 104a-c may add its reuse STAs 106 in or to the DL COBF transmissions 626 if the AP 104 has available dimensions. In some embodiments, the resource units for UL block acknowledgements 627 may be indicated in the NDPA and scheduling frames of one or more of the communications 615, 617, and/or 619.

Figure 7A:
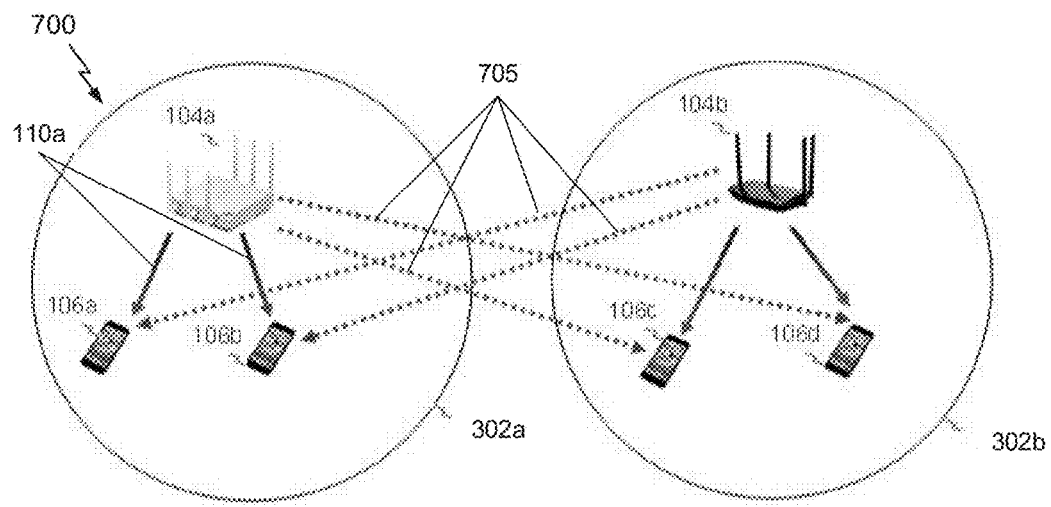
FIG. 7A schematically illustrates an example MIMO wireless communication system in which COBF is employed by a plurality of access points (APs) to communicate with a plurality of stations (STAs) belonging to corresponding basic service sets (BSSs), in accordance with certain embodiments described herein.

FIG. 7A schematically illustrates an example multiple-access MIMO wireless communication system 700 in which coordinated beamforming (COBF) may be used by access points (APs) 104a-b to communicate with stations (STAs) 106a-d belonging to corresponding basic service sets (BSSs) 302a-b, in accordance with certain embodiments described herein. The APs 104, STAs 106, and BSSs 302 illustrated in FIG. 7A have the same functionality as the APs 104, STAs 106, and BSSs 302 illustrated in FIG. 3, they are not associated with each other as is illustrated in FIG. 3 but instead are associated as illustrated in FIG. 7A to simplify describing FIG. 7A.

The APs 104a-b (also referred to herein collectively as "the APs 104" or individually as "the AP 104") communicate with the STAs 106a-d (also referred to herein collectively as "the STAs 106" or individually as "the STA 106"). The AP 104 may also be referred to as a base station or using some other terminology. Also as described above, the STA 106 may be fixed or mobile and may also be referred to as a user terminal, a mobile station, a wireless device, or using some other terminology.

The APs 104a-b may act as base stations and provide wireless communication coverage in corresponding basic service areas (BSAs). The AP 104a along with the STAs 106a-b associated with the AP 104a and that use the AP 104a for communication may be referred to as a basic service set (BSS) 302a. The AP 104b along with the STAs 106c-d associated with the AP 104b and that use the AP 104b for communication may be referred to as a basic service set (BSS) 302b. It should be noted that the wireless communication system 700 may not have a central AP 104, but rather may function as a peer-to-peer network (e.g. TDLS, WiFi-Direct) between the STAs 106. Accordingly, the functions of the APs 104a-b described herein may alternatively be performed by one or more of the STAs 106.

The APs 104a-b may communicate with one or more STAs 106 at any given moment via communications links 110. One exemplary communication link 110a may facilitate transmission between the AP 104a and one or more of its associated STAs 106a and 106b of the BSS 302a. As shown in FIG. 7A, data transmissions to BSS STAs 106 are shown as solid lines between the AP 104a and STAs 106a-b and AP 104b and STAs 106c-d, while steered null transmissions 705 to OBSS STAs are shown as dashed lines between the AP 104a and STAs 106c-d and AP 104b and STAs 106a-b.

Accordingly, each AP 104a-b may use coordinated beamforming to simultaneously communicate with corresponding BSS (or associated) STAs 106a-d while nulling OBSS (or non-associated) STAs 106a-d. The coordinated beamforming may allow the APs 104a-b to simultaneously transmit data to respective BSS STAs 106 without causing interfering with the OBSS STAs 106. Therefore, in the system 700, transmissions for a particular STA 106 are only transmitted from a single AP 104 while the STA 106 only receives nulls from OBSS APs 104.

Figure 7B:
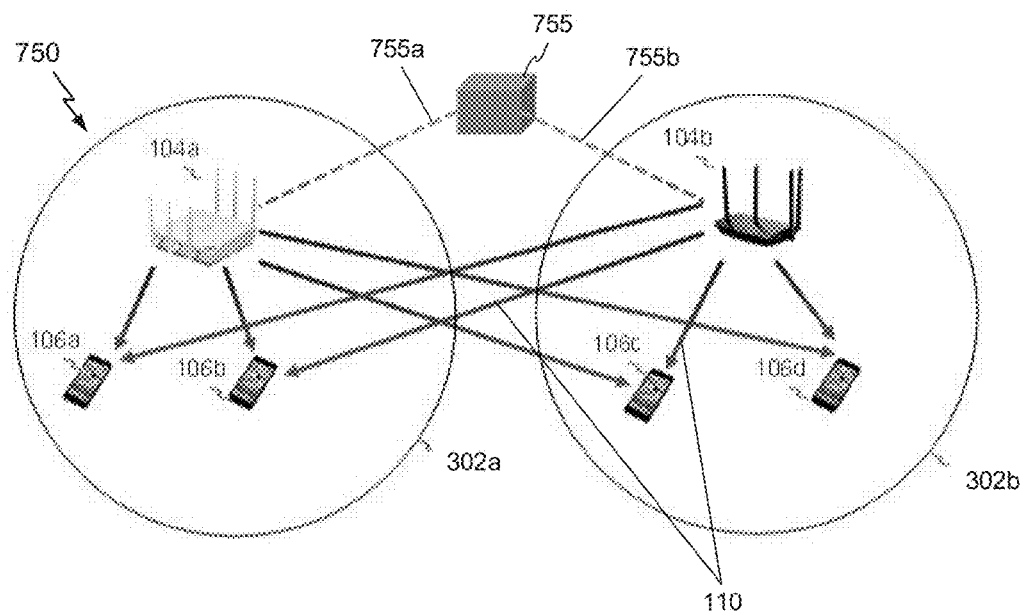
FIG. 7B schematically illustrates an example joint transmission multiple-access MIMO wireless communication system in which COBF may be used by the plurality of APs to communicate with the plurality if STAs belonging to their own and other BSSs, in accordance with certain embodiments described herein.

FIG. 7B schematically illustrates an example joint transmission multiple-access MIMO wireless communication system 750 in which COBF may be used by APs 104 to communicate with STAs 106 belonging to their own and other BSSs 302, in accordance with certain embodiments described herein. Similar components and communications as described herein in relation to FIG. 7A will not be described again here.

As described in relation to FIG. 7A, the APs 104a-b may communicate with one or more STAs 106 at any given moment via communications links 110. However, contrary to the APs 104a-b of FIG. 7A, the APs 104a-b may both be configured to transmit data to a single STA 106 (e.g., STA 106a). As shown in FIG. 7B, data transmissions to STAs 106 are shown as solid lines between the APs 104a-b and all of the STAs 106a-d. As opposed to the communications links 110 shown in FIG. 7A, FIG. 7B includes no steered null transmissions 705 to OBSS STAs 106 from APs 104 (e.g., no dashed lines between either of the APs 104a-d and any of the STAs 106c-d). Instead all of the communication links 110 shown, including the identified communication links 110 from AP 104b to STA 106c and STA 106b, are data transmissions between the APs 104a-b and the STAs 106a-d.

When each of the APs 104a-b are able to transmit data to each STA 106, the data to be transmitted to each STA 106 may be made available to each of the APs 104a-b so that either of the APs 104a-b may transmit any portion(s) of the data to the STA 106. Additionally, coordinating the data transmission from the APs 104a-b and the STA 106 may be more involved than when only a single AP 104a-b transmits data to the STA 106.

For example, when multiple APs 104 are each transmitting a portion of the data to the STA 106, the data transmissions of each AP 104 must be coordinated with the other APs 104 to ensure that data transmissions are not duplicated, that all data is transmitted, that data transmissions do not overlap each other, etc. In some embodiments, a master access point (AP) 104 (e.g., AP 104a) or an external controller (e.g., central controller 755) controls and/or coordinates the communications between the APs 104a-b and the STA 106. The central controller 755 (or master AP 104a) may establish a backhaul network between itself and all communicating APs 104. The backhaul network may comprise backhaul links 755a and 755b between the central controller 755 (or master AP 104a) and the communicating APs 104 (e.g., APs 104a and 104b). When the master AP 104a manages the joint transmission communication system 750, the remaining APs 104 of the joint transmission communication system 750 may be slave access points (APs) 104. When the central controller 755 manages the joint transmission communication system 750, then all of the APs 104 of the joint transmission communication system 750 may be slave APs 104. In some embodiments, the central controller 755 implemented in the joint transmission communication system 750 may utilize a precoder over an array of antennas (e.g., the transmitter antennas 216 of all associated APs 104, e.g., APs 104a-b of FIG. 7B). The precoder and the central controller 755 may coordinate timing synchronization between the APs 104a-b and the corresponding transmitter antennas 216. The precoder may ensure that transmissions from APs 104 to a STA 106 will not be too strong at other STAs 106. The coordinated timing synchronization may be important when different APs 104a-b are jointly transmitting data transmissions to a single, shared, or multiple STAs 106.

In some embodiments, the central controller 755 coordinating timing synchronization between the APs 104 and the STA 106 may also control or manage synchronization between the APs 104. The APs 104 participating in transmitting data to the STA 106 may participate in joint transmissions. In certain embodiments to enable and maintain efficient and complete joint transmissions between the APs 104 and the STA 106, the phase deltas across the APs 104 are tracked and/or synchronized. In some embodiments, the phase of an AP 104 can be thought to be equal to or related to a local oscillator ("LO") phase (measured in degrees or radians). If a frequency of the LO is constant (e.g., no jitters), then the phase of the LO changes linearly with time. This may occur for every AP 104. However, if different APs 104 have slightly different frequencies at their LOs, then the phase of the APs 104s may diverge with time. Additionally, the effective phase of APs 104 may jitter due to phase noise, which may be different for each AP 104. Moreover, any timing offsets between one AP 104 and a STA 106 may appear as a phase ramp in frequency in the channel from that AP 104 to the STA 106.

In certain embodiments, there are different phase-ramps corresponding to different APs 104 at the same STA 106. Such an arrangement is acceptable when the difference between the phase ramps stays constant. In contrast, a change in relative phase of the APs 104 beyond a certain amount can result in the precoding no longer being valid. The phase of an AP 104 may refer to a power level of transmission by the AP 104. A change in "relative" phase between APs 104 may cause problems when what is being measure as a relative phase during a sounding period is different from the relative phase at a time of actual transmission. Since precoding for the transmission was done based on what was measured during the sounding period, the precoding may not remain valid if the relative phase during the transmission drifts beyond a certain limit or threshold. The relative phase drift may result in the strength of a signal and/or transmission meant for one user being high enough at a second user to cause interference at the second user. When precoding is working well, each user may only see signals and/or transmissions meant for that user while signals and/or transmissions meant for other users are weak enough to not cause interference for the user. Thus, it may be desirable to maintain phases (or phase deltas) between devices within given amounts or thresholds.

When managing joint transmissions by the APs 104, the phase deltas (e.g., differences) between the participating APs 104 (e.g., the APs 104 that are transmitting data to the STA 106) may cause the issues in the joint transmissions described herein. Various benefits may be realized by maintaining phase deltas across the APs 104. By maintaining the phase deltas, the transmissions may not cause interference between receiving devices. Accordingly, when the phase drift exceeds a threshold amount, the devices (e.g., the APs 104a and 104b) may be synchronized to within a threshold phase drift.

In some embodiments, the phase deltas of the APs 104 participating in the joint transmissions may be maintained at constant levels during the sounding and transmission periods (e.g., the sounding period and the transmission period described in relation to FIG. 6) of distributed MIMO sessions. Alternatively, or additionally, the phase deltas of the APs 104 participating in the joint transmission may be maintained at approximately a constant level or some other level through periodic phase synchronizations. If the phase deltas of the APs 104 begin to change from the initial phase delta (e.g., the phase delta begins to increase or decrease), synchronization may be used to "correct" the phase delta (e.g., phase correction) to the initial value or a value substantially similar to the initial value.

In joint transmissions, the collective antennas 216 of the APs 104 may mimic or operate as a single antenna array. From the perspective of the receiving STA 106, the antennas 216 of the APs 104 may be treated or appear as the single antenna array. However, phase drift or phase delta drifts (hereinafter "phase drifts") may disrupt the "single antenna array" operation or view of the collective antennas of the APs 104. Specifically, while phase drifts may occur in general operation of the APs 104 and their antennas 216, these phase drifts may cause the phase differences of the APs 104 to change between the sounding and data transmission period. As the phase drifts cause phase differences of the APs 104 between the sounding and the data transmission periods, the joint transmissions by the APs 104 may be adversely impacted by potentially introducing cross user or cross stream leakage and increasing interference between APs 104 and STAs 106.

Accordingly, such phase drift may desirably be minimized or avoided by synchronizing phases and/or phase drifts and/or by avoiding protocols that may lead to an introduction of relative phase offsets across the APs 104. In some embodiments, one or more phase drifts may be detected by the central controller 755 or a similar component configured to monitor and/or track phase drift and/or phase delta drift between the APs 104. If a phase drift is detected, then the central controller 755 may synchronize the phases of one or more of the "drifting" APs 104. Such synchronization may occur during one or more of the sounding period and the data distribution period. In some embodiments, the synchronization may occur during the data distribution period, for example, when the data distribution period is of an extended duration (e.g., more than a typical data distribution period). Advantageously, phase drifts across STAs 106 do not impact the joint transmissions described herein.

In the joint transmission communication system 750, the backhaul or similar communication network shown with backhaul links 755a-b may exist between the APs 104 participating in the joint transmission. The backhaul links 755a-b may provide for time and/or frequency synchronization between the APs 104. For example, the backhaul links 755a-b may allow the APs 104 to coordinate their clocks and frequencies over which the APs 104 will communicate. In some implementations, the backhaul links 755a-b may also be used to share the data to be transmitted and any data received with all of the APs 104. In some instances, phase synchronization may be performed via the backhaul links 755a-b as well.

Phase synchronization signals or transmissions may be used to maintain the phase drift or drift of phase difference between APs 104 to be within a few degrees during the various periods of a communication window or transmission opportunity. The phase synchronization signals may be transmitted by the master AP 104 or the central controller 755.

In certain embodiments when the APs 104 have a frequency offset of 10 Hz between each other, a 1 ms time period may result in a 3.6 degree shift in the phase difference between the APs 104. In some embodiments, the 3.6 degree phase difference shift may be high enough to warrant phase synchronization at approximately 1 ms intervals. Accordingly, phase synchronization may be implemented at the beginning of each joint transmission. In some embodiments, depending on a length of the joint transmission, the phase synchronization may be performed during the joint transmission itself. For example, a master AP 104 may transmit a synchronization frame (e.g., sync frame) to achieve the phase synchronization across the APs 104.

In some embodiments, the APs 104 that utilize automatic gain control (AGC) may experience increased phase difference drifts. For example, different gain states that result from the AGC may result in different amplitudes and phases to correspond with the different gain states. Thus, as the gain states for the APs 104 change, the corresponding amplitudes and phases may change. Thus, in one situation, when a slave AP 104 using AGC attempts to synchronize with the master AP 104 (or the central controller 755), if the gain state of the slave AP 104 is different when the phase synchronization signal is received as compared to the gain state during a previous reference or reference signal, then the phase synchronization may not achieve the desired tight phase drift synchronization. In another situation, channel measurements by the STA 106 may have different gain states for different APs 104.

The joint transmission communication system 750 may utilize different sounding and transmission period requirements and communications as compared to the sounding and transmission periods shown in FIG. 6 for the system 700. For example, the antennas 216 for the APs 104 of the system 700 are sounded in separate NDP/NDPA transmissions (see, for example, communications 615, 617, and 619 of FIG. 6). Each NDP transmission may have its own phase and receipt AGC setting and may be communicated at different times for each of the APs 104. Accordingly, it may be difficult for the central controller 755 to utilize sounding measurements resulting from different NDPs together. Additionally, relative timing among the AP 104 antennas may not be constant across the sounding periods and the transmission periods.

For the joint transmission communication system 750, the participating APs 104 may be sounded together (e.g., at the same time). For example, the NDP transmissions for each of the participating APs 104 may be transmitted at the same time. When explicit sounding is used (e.g., when the sounding information is determined by the STA 106 in response to NDPs transmitted by the APs 104), a joint NDP may be transmitted by the APs 104. The joint NDP may be transmitted by the APs 104 to all of the STAs 106, as will be described in more detail herein. Another difference between the joint transmission system 750 and the communication system 700 is that in the joint transmission system 750, feedback received from the STA 106 in response to the NDP transmissions may be received from the STA 106 by any of the APs 104, which can disseminate the received feedback to the other APs 104 of the system 750. In the communication system 700, each AP 104 receives feedback signals from the STA 106 individually with no sharing of feedback information between the APs 104. In some embodiments, the sharing of feedback (and potentially other information) may be accomplished via the backhaul links 755*a-b*.

Figure 8A:
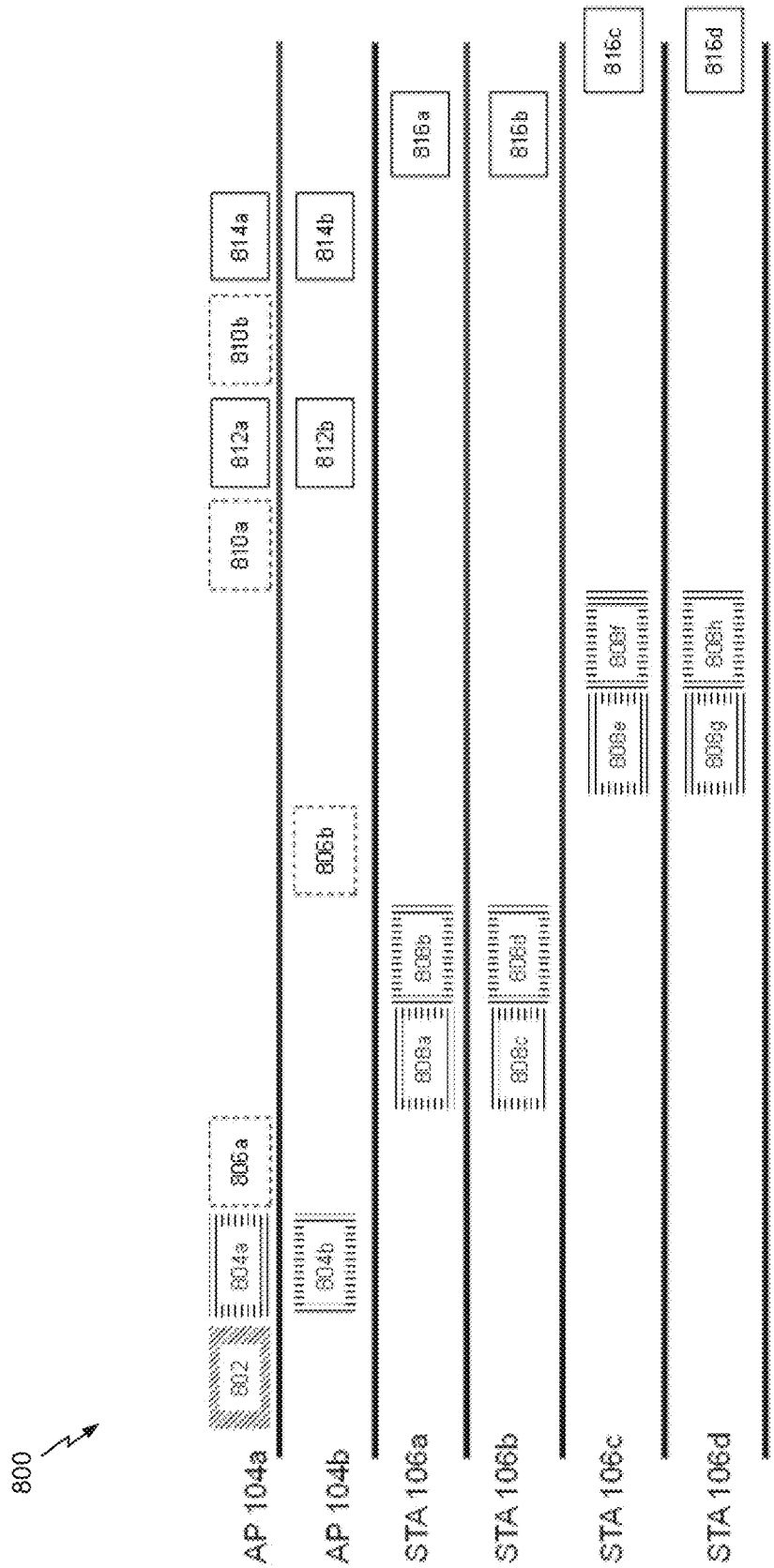
FIG. 8A schematically illustrates an exemplary communication option in a joint transmission opportunity of the joint communication system of FIG. 7B, with non-simultaneous STA feedback.
Figure 8B:
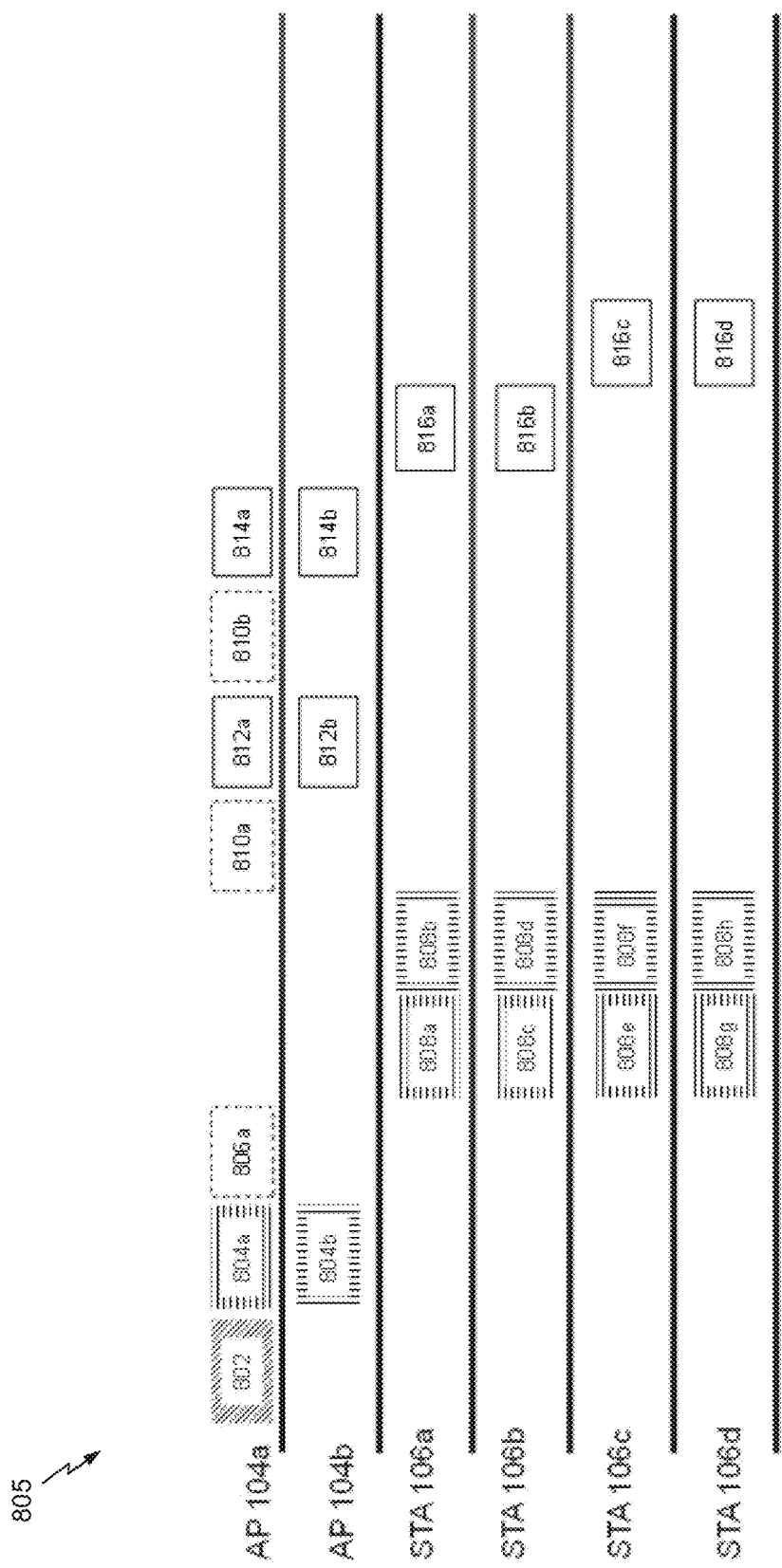
FIG. 8B schematically illustrates an exemplary communication option in a joint transmission opportunity of the joint communication system of FIG. 7B, with simultaneous STA feedback.

FIGS. 8A-8B schematically illustrate an exemplary communication option in a joint transmission opportunity 800, 805 of the joint communication system 750 of FIG. 7B, with non-simultaneous STA feedback 808 (FIG. 8A) and simultaneous STA feedback 808 (FIG. 8B). The AP 104*a* may be associated with the STAs 106*a-b*. The AP 104*b* may be associated with the STAs 106*c-d*. The joint transmission opportunity 800 may depict two phases corresponding to a sounding period and a transmission period. Group formation may be achieved via the backhaul links 755*a-b*. Group formation may correspond to identifying which APs 104 and STAs 106 will participate in the joint transmission opportunity 800. The joint transmission system 750 may utilize master and slave APs 104 or the central controller 755 and controlled (or slave) APs 104. Furthermore, the joint transmission system 750 may utilize either explicit or implicit sounding. As described above, explicit sounding occurs when the APs 104 transmit NDPs to which the STAs 106 respond with feedback measurements. Implicit sounding occurs when the STAs 106 send a communication to the APs 104 and the APs 104 generate measurements based on the received communication.

The joint transmission opportunity 800 may begin with the master AP 104*a* transmitting an NDPA message 802. This may coincide with the beginning of the sounding period of the joint transmission opportunity 800. As utilized herein, the controller (e.g., the central controller 755 of FIG. 7B) and the master AP 104*a* may perform functions, and may be referenced, interchangeably. The AP 104*a* that transmits the NDPA 802 may be designated as the master AP 104*a* and the remaining APs 104*b* may be designated as slave APs 104*b*. The slave APs 104*b* may be responsible for synchronizing with the master AP 104*a*, where synchronizing includes synchronizing one or more of time (e.g., clocks), frequency, and phase drift. As described herein, the NDPA 802 may serve to announce a subsequent NDP transmission and may serve as a synchronization message too.

The NDPA 802 may identify all STAs 106 that will be receiving information via joint transmissions and a number of streams being allocated to each STA 106. In some embodiments, when serving as the synchronization message, the NDPA 802 may include necessary information to synchronize the phase drift between the slave APs 104*b*. For example, the NDPA 802 may let the slave APs 104 (e.g., AP 104*b*) synchronize their frequencies to the master AP 104 (e.g., AP 104*a*) frequency. Additionally, the NDPA 802 may provide a reference or reference phase to the slave APs 104 (e.g., AP 104*b*).

The sounding period may continue with the master AP 104 and participating slave APs 104 each transmitting NDP transmission 804*a* and 804*b*, respectively, where the NDP transmissions 804*a* and 804*b* are transmitted at the same time by the APs 104. Following the NDP transmissions 804*a* and 804*b*, the master AP 104*a* may transmit an optional trigger frame 806*a* to indicate to the STAs 106 when the STAs 106 should transmit their feedback.

Following the trigger frame 806*a*, the STAs 106*a* and 106*b* may simultaneously transmit their feedback to the APs 104. In some embodiments, the STAs 106 may transmit the feedback using uplink MU-MIMO transmissions 808. For example, the STA 106*a* may transmit feedback via transmissions 808*a*-808*b* while the STA 106*b* may transmit feedback via transmissions 808*c*-808*d*. In some embodiments, the transmissions 808*a*-808*b* may be combined into a single PPDU sent to the master AP 104*a* even though the transmissions 808a-808b include feedback from two separate NDPs from the master AP 104a and the slave AP 104b.

Similarly, the transmissions 808c-d may be combined into a single PPDU sent to the master AP 104a. Additionally, the STA 106c may transmit feedback via transmissions 808e-808f while the STA 106d may transmit feedback via transmissions 808g-808h following a second optional trigger frame 806b. The feedback transmitted from STAs 106 may be sent to the AP 104 that sends the trigger because the responding STAs 106 may synchronize to that AP 104 via the trigger and possibly get power and rate control information in the trigger frame 806 about that feedback transmission.

In some embodiments, the transmissions 808e-808f and the transmissions 808g-h are combined into a single PPDU sent to the slave AP 104b. In some embodiments, the receiving AP 104 of the transmissions 808a-808h may be arbitrary. In some embodiments, the receiving AP 104 may be determined based on the BSS 302 to which the STAs 106 belong (e.g., based on the AP 104 with which the STA 106 is associated). Once the APs 104 receive the feedback transmissions 808a-h from their corresponding STAs 106, the APs 104 may share or disseminate the feedback received over the backhaul links 755a, 755b to the other APs 104. Thus, the feedback information need only be received by a single AP 104 for all of the APs 104 to obtain and utilize the feedback information.

As shown in FIG. 8A, the feedback transmissions 808a-808d and 808e-h from the STAs 106a-b and STAs 106c-d, respectively, may not be received simultaneously. These feedback transmissions may be received separately because the APs 104 may be unable to receive feedback from all the STAs 106 simultaneously due to lack of joint MIMO reception in the uplink. This may be a result of a quantity of users and/or streams being supported by the APs 104 during data transmission. For example, a quantity of antennas of the APs 104 being used for joint transmission may limit a quantity of antennas available for reception of feedback. However, if the APs 104 support joint reception (e.g., where the receive antennas of all the APs 104 operate as a receive antenna array) and the received measurements (e.g., feedback transmissions 808) from the STAs 106 can be processed together, then the STAs 106 may transmit their feedback transmission simultaneously, as shown in FIG. 8B.

As seen from comparing FIGS. 8A and 8B, by allowing simultaneous feedback from all STAs 106, the duration of the entire joint transmission opportunity may be reduced or additional time may be dedicated to data transmission. However, a natural division may be for feedback to be communicated according to BSS 302 associations and then have the feedback shared via the backhaul links 755a, 755b. Feedback messages being received by the APs 104 may conclude the sounding period.

The transmission period may include optional trigger frames 810a-b for phase synchronizing. For example, the trigger frames 810a-b may include similar phase information as the NDPA 802 described above. For example, the trigger frames 810a-b may include a reference or reference phase to the slave APs 104 based on a phase of the master AP 104.

In some embodiments, the NDPA may plan for a certain number of streams and a certain group or grouping of STAs 106. However, once the AP 104 receives channel state information ("CSI") from the STAs 106, the master AP 104 may make changes to the plan. For example, the master AP 104 change how many streams an STA 106 receives or may choose to exclude one or more STAs 106 from the joint transmission opportunity based on poor channel conditions or high correlations between channels of STAs 106.

In response to the trigger frames 810a-b, the APs 104 that are participating in the joint transmission may synchronize their phase based on the reference or reference phase and then may transmit their data, e.g., via a distributed MIMO transmission 812a-b. As shown, the APs 104a-b transmit data during the MIMO transmissions 812a-b simultaneously. There may be multiple instances of the optional trigger frames 810 and MIMO transmissions 812, with two instances shown in FIGS. 8A and 8B. The transmission period may be concluded with acknowledgement messages 816a-d being transmitted from each STA 106. In some embodiments, the acknowledgement messages 816a-d may be transmitted simultaneously or in groups according to associated BSS 302. In some embodiments, the acknowledgement messages 816a-d may be transmitted by the STAs 106 using uplink MIMO transmissions.

Thus, the joint transmission opportunity 800, 805 shown in FIGS. 8A and 8B may be based on NDPA and NDP messages, where one AP 104 serves as a master AP 104 and starts the sounding process through an NDPA 802. The NDPA 802 may also serve the purpose of synchronizing slave APs 104 to the master AP 104. Once the slave APs 104 are synchronized to the master AP 104, the slaves and master APs 104 may then transmit the NDPs 804 together (e.g., simultaneously).

The STAs 106 may provide channel state information (CSI) as feedback 808 to the NDP 804. The feedback 808 may be received by one BSS 302 at a time. Such feedback may be one or more of UL MU-MIMO, UL OFDMA, and sequential transmissions. When the feedback 808 is received by one BSS 302 at a time, the optional trigger 806 may be needed before every BSS's feedback transmissions between corresponding STAs 106 and AP 104.

Once the STAs 106 send their feedback to their BSS AP 104, the AP 104 shares the CSI with the other APs 104. In some embodiments, the BSSs 302 have STAs 106 transmitting feedback 808 in the UL simultaneously. Alternatively, joint MIMO reception may be used to receive information simultaneously for all STAs 106. Accordingly, the samples received at each AP 104 antenna need to be exchanged and processed at one place (e.g., central controller 755 or AP 104) to decode the potentially large simultaneous MIMO feedback reception. Once the feedback is received at the APs 104, the APs 104 may transmit their data to the STAs 106, using synchronization frames to maintain desired phase drift constraints.

In some embodiments, the two protocols are modified so that where each AP 104 sounds separately (e.g., similar to the sounding shown in FIG. 6) their feedback is stitched together.

Figure 9A:
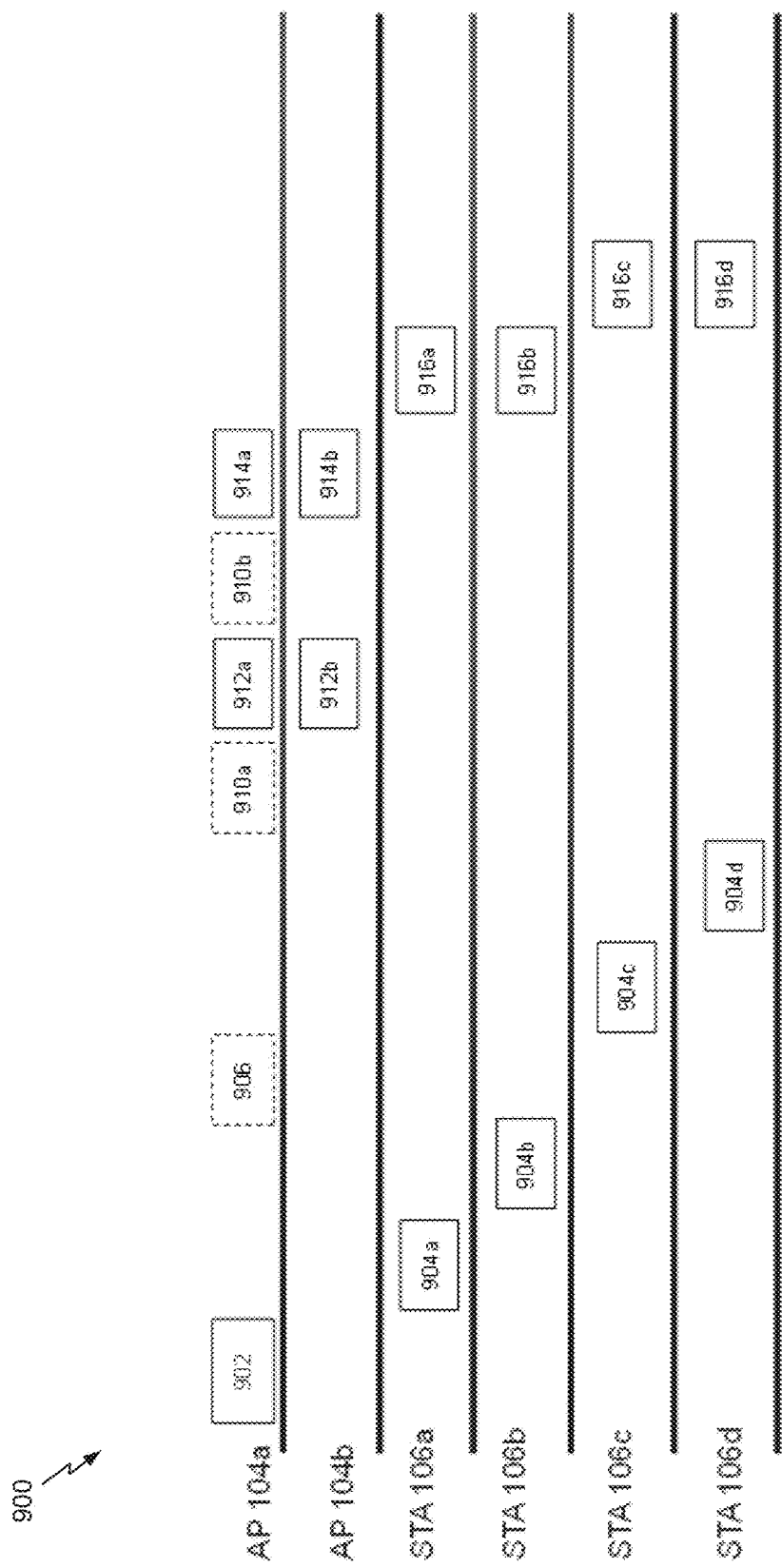
FIG. 9A schematically illustrates an exemplary communication option in a joint transmission opportunity of the joint communication system of FIG. 7B using non-simultaneous implicit sounding.
Figure 9B:
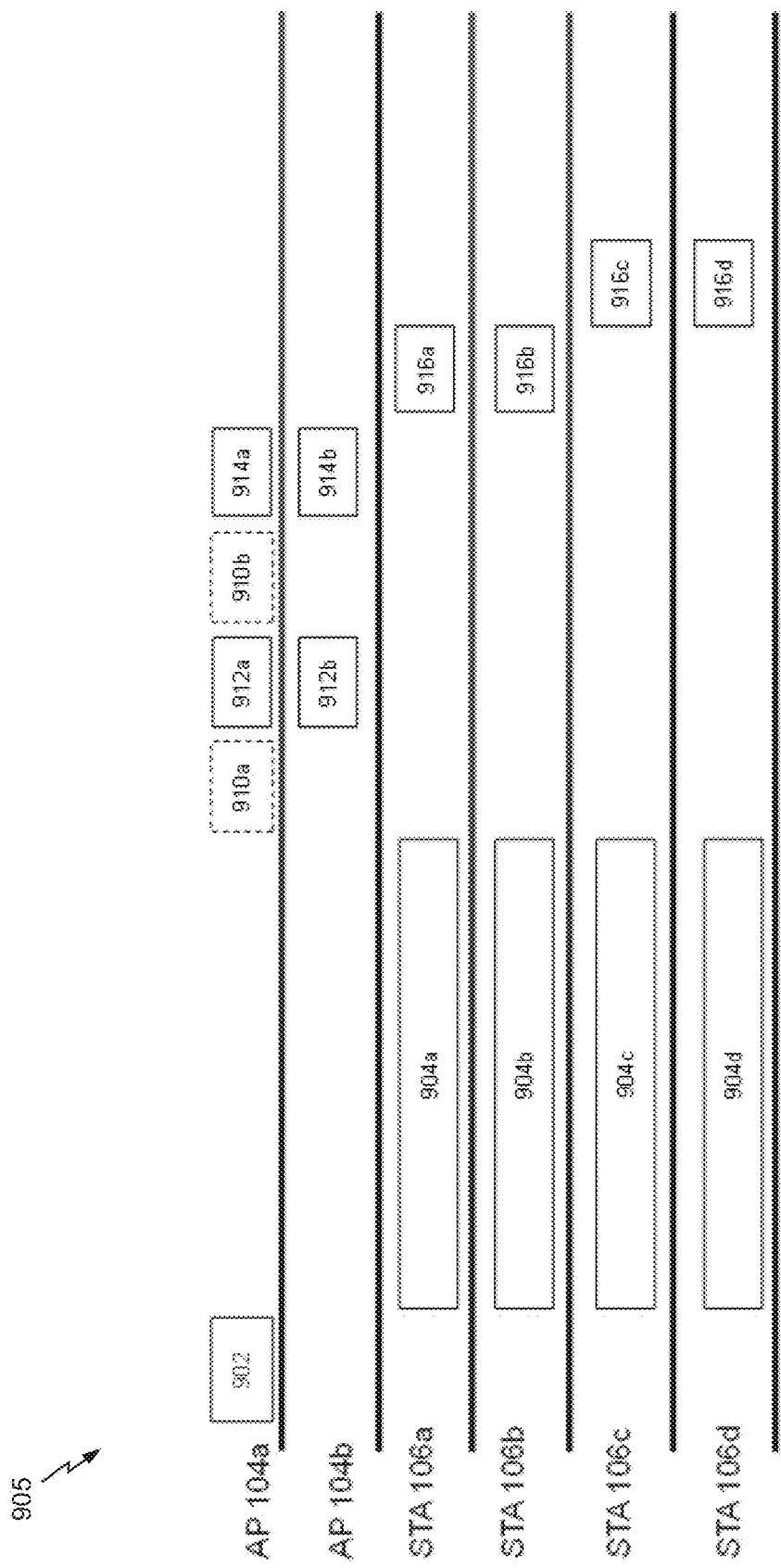
FIG. 9B schematically illustrates an exemplary communication option in a joint transmission opportunity of the joint communication system of FIG. 7B using simultaneous implicit sounding.

FIGS. 9A-9B schematically illustrate an exemplary communication option in a joint transmission opportunity 900, 905 of the joint communication system 750 of FIG. 7B using implicit sounding, with non-simultaneous implicit sounding (FIG. 9A) and simultaneous implicit sounding (FIG. 9B). The AP 104a may be associated with the STA 106a-106b. The AP 104b may be associated with the STAs 106c-106d. The joint transmission opportunity 800 may depict two phases corresponding to a sounding period and a transmission period. Group formation may be achieved via the backhaul links 755a, 755b. However, the sounding period shown in FIGS. 9A and 9B includes implicit sounding as compared to the explicit sounding of FIGS. 8A and 8B.

The joint transmission opportunity 900, 905 may begin with the master AP 104 transmitting an NDPA message 902.

This may coincide with the beginning of the sounding period of the joint transmission opportunity 900, 905. As described herein, the NDPA 902 may serve to announce a subsequent NDP transmission and may also serve as a synchronization message.

The NDPA 902 may identify all STAs 106 that will be receiving information via joint transmissions and a number of streams being allocated to each STA 106. In some embodiments, when serving as the synchronization message, the NDPA 902 may include necessary information to synchronize the phase drift between the slave APs 104. For example, the NDPA 902 may let the slave APs 104 synchronize their frequencies to the master AP 104 frequency. Additionally, the NDPA 902 may provide a reference or reference phase to the slave APs 104.

The sounding period may continue with the STAs 106a-d respectively transmitting uplink NDP messages 904a-d to the APs 104. All APs 104 may receive the NDP messages 904 because every AP 104 may need to know what channel it will use for each antenna to communicate with participating STAs 106.

In some embodiments, while the STAs 106 are transmitting their NDP messages 904a-d, the master AP 104 may transmit a reference or reference signal or a synchronization frame 906, that may allow for phase synchronization between the APs 104 and/or the STAs 106. The synchronization frame 906 may be periodically transmitted by the master AP 104 including a reference or reference signal that may be used by the other APs 104 and the STAs 106 to enable phase synchronization. In some embodiments, the reference or reference signal maybe embedded on other frames e.g., NDPA frames or trigger frames. One or more synchronization frames 906 may be used as needed to keep the phase drift within desired constraints.

Alternatively, or additionally, phase drift values may range from between 0 and 16 degrees, with the different phase values resulting in different transmission rates at different pathloss values. In some embodiments, phase drift values of less than 12 degrees may provide improved transmission gains over single cell MU-MIMO transmissions.

One or more of the APs 104 may use the UL NDPs 904a-d from the STAs 106a-d to estimate uplink channel information, which may provide for transmit power settings for the APs 104. Once the STAs 106a-d transmit the NDPs 904a-d to the AP 104 (e.g., AP 104a), the sounding period may end and the transmission period may begin.

The transmission period may include optional trigger frames 910a-b for phase synchronizing. For example, the trigger frames 910a-b may include similar phase information as the NDPA 902 described above. For example, the trigger frames 910a-b may include a reference or reference phase to the slave APs 104 based on a phase of the master AP 104. In response to the trigger frames 910a-b, the APs 104 that are participating in the joint transmission may synchronize their phase based on the reference or reference phase and then may transmit their data, e.g., via a distributed MIMO transmission 912a-b. As shown, the APs 104a-b transmit data during the MIMO transmissions 912a-b simultaneously. There may be multiple instances of the optional trigger frames 910 and MIMO transmissions 912 and 914, with two instances shown in FIGS. 9A and 9B. The transmission period may conclude with acknowledgement messages 916a-d being transmitted from each STA 106. In some embodiments, the acknowledgement messages 916a-d may be transmitted simultaneously or in groups according to associated BSS 302. In some embodiments, the acknowledgement messages 916a-d may be transmitted by the STAs 106 using uplink MIMO transmissions.

The transmission opportunity 905 of FIG. 9B is similar to the transmission opportunity 900 FIG. 9A with the exception that the UL NPDs 904a-d are transmitted by the STAs 106 to the APs 104 simultaneously.

In some embodiments, periodic phase synchronization frames may be used during distributed MU-MIMO transmissions. In some embodiments, the period for the phase synchronization frames may be determined, at least in part, on a time over which the phase drift across the APs 104 stays within desired constraints or limits. For example, as discussed herein, a phase drift of up to 3.6 degrees may be tolerated for joint transmission systems. Other phase drift values may be tolerated based on performance loss requirements/toleration values and/or other desired performance metrics for maximized joint transmission gains. In some embodiments, one or more of the phase synchronization frames may be combined or integrated into other frames (e.g., the NDPA frames 802/902) or may be standalone frames (e.g., synchronization frame 906).

In some embodiments, NDP multiplexing may be utilized. For example, explicit sounding in joint NDP may apply different methods to multiplex long training fields (LTFs). In implicit sounding, STAs 106 may time division multiplex (TDM) the UL NDPs or the STAs 106 may send the UL NDPs simultaneously and multiplex the LTFs.

When multiple APs 104 or STAs 106 are transmitting NDPs at the same time, the streams in LTFs can be multiplexed in a number of ways. In a first way, the LTFs are multiplexed using frequency division multiplexing (FDM), where every stream steps on different tones in each LTF symbol. Alternatively, or additionally, FDM in combination with a P-matrix may be used to multiplex the LTFs. Accordingly, streams for one of the APs 104 are multiplexed using the P-matrix but different APs 104 use non-overlapping tones. Alternatively, or additionally, P-matrices alone may be used, where the total streams for all the APs 104 form a single P-matrix that is generally large. Alternatively, or additionally, TDM may be used only, where one stream is allocated one LTF. Finally, alternatively or additionally, TDM may be used in combination with the P-matrix such that the streams of one AP 104 are multiplexed using P-matrix but different APs 104 are active on different LTF symbols.

As discussed herein, joint transmissions may be sensitive to phase and/or gain offsets. To minimize impact of potential phase and/or gain offsets, transmission power of the APs 104 may be maintained at a constant (or substantially constant) level between NDP transmission and data transmission. Additionally, or alternatively, AGC states for slave APs 104 that receives phase synchronization messages may need to be maintained at a constant state from the sounding period and through the transmission period.

Additionally, NDP transmissions may be frequency and time synchronized through either the backhaul links 755a, 755b or precorrected (e.g., prior to transmission) based on the received NDPA frame 802/902. In the subsequent transmission period, the APs 104 may apply the same or similar frequency and time corrections as those applied for NDP transmissions based on the backhaul or the precorrections. In some embodiments, the NDP transmissions may include a preamble in which all the APs 104 transmit the same content.

Alternatively, or additionally, tracking during LTFs of joint NDPs may be performed. Such tracking may be performed in one or more ways and based on one or more conditions. For example, when the APs 104 are not all synchronized, multiple linear oscillators (LOs) may need to be tracked, where one LO is tracked per AP 104. This may be different than the tracking in 802.11ax/11ac DL MU-MIMO transmission, where only one LO needs to be tracked because only one AP 104 is transmitting to each STA 106. In some embodiments, aspects of UL MU-MIMO transmissions in 802.11ax may be implemented in the LO tracking. In some embodiments, if NDPs of different APs 104 are multiplexed using FDM in frequency, then tracking phases of each of the APs 104 may be simplified. Accordingly, tracking may be performed using pilots for different APs 104 on non-overlapping tones. Alternatively, or additionally, if NDPs of different APs 104 are multiplexed using TDM in time, then tracking phases of each of the APs 104 may involve interleaving symbols of one AP 104 as opposed to having consecutive symbols from a single AP 104. If P-matrix is used alone and a large P-matrix exists, multi-stream pilots may be used to track, where one stream per AP 104 exists for pilot tones or where a number of streams per AP 104 for pilot tones equals a number of streams given to that AP in the LTF section. Alternatively, or additionally, non-overlapping pilot tones may be assigned to different APs.

As noted above, AGC may introduce difficulties in phase drift identification and correction. For example, different gain states for APs 104 may lead to amplitude and phase shifts, which may introduce various issues. A first issue may exist when slave APs 104 attempt to synchronize with the master AP 104. If the gain state of the slave APs 104 can change, then their gain state may change across different references or reference signals. For example, the slave AP 104 may have a first gain state when a first reference or reference signal is received but a second gain state when a second reference or reference signal is received. Due to the different gain states and different references or reference signals, the change in the phase may not be easily attributable, as it may have been caused by either the change in the gain state between the two reception times or by a phase change in the reference or reference signal itself. Thus, the correction may not work depending on the cause of the phase drift. To counter such an issue, AGC self-calibration may be implemented. For example, the AP 104 may measure a loop back channel at different gain states and observe a phase change relative to a reference gain state level. Thus, the AP 104 may track what changes are pursuant to different gain states and remaining phase differences may be determined to result from phase drift.

Alternatively, or additionally, the issue may be countered by having the slave APs 104 maintain a fixed gain state for each of the master AP 104 phase synchronization signals. For example, a signal may be communicated via the backhaul links 755a, 755b or OTA indicating that a synchronization signal from the master AP 104 is following. Once such a signal is received, the slave APs 104 may know to use a specific gain state (e.g., the gain state that was being used when the original reference or reference signal was received). Alternatively, or additionally, the synchronization signal itself may include an indicator of an AGC setting for channel estimation identifying the signal as a synchronization signal and thereby signaling the slave AP 104 to use a particular AGC state.

As another issue, a channel measurement by APs 104 based on the NDPs of the STAs 106 in implicit sounding may vary based on the gain state of the measuring AP 104. This issue may be countered by reversing an impact of AGC amplitude and phase shifts per sub-carrier before channels measurements at different APs 104 can be used together. One method may include self-calibration, where each slave AP 104 corrects for the gain state related phase/amplitude change, and only feedbacks raw channels to the master AP 104.

In some embodiments, APs 104 may be calibrated over a period of hours or days to correct for mismatch at APs 104 when implicit sounding is implemented. For example, a radio frequency (RF) chain of a receiver may have a different amplitude and/or phase than the RF chain of the transmitter.

As described herein, the backhaul links 755a, 755b may provide for synchronization of the frequency and timing and clock drift for the APs 104. In some embodiments, GPS may be used instead or in addition to the backhaul. Any remaining drift in frequency, timing, or clock drift may result in a phase offset. Such phase offset may be corrected using phase synchronization before and/or during distributed MU-MIMO transmissions. The phase synchronization may be used before all sounding and transmission periods and/or during all sounding and transmission periods to coordinate phases of the APs 104. When AGC is used with the APs 104, AGC self-calibration may be used to identify phase shifts caused by phase drift as opposed to phase shifts caused by AGC. Alternatively, or additionally, having the AP 104 maintain or revert its AGC state for phase synchronization signals may allow for determination of the phase draft.

Figure 10:
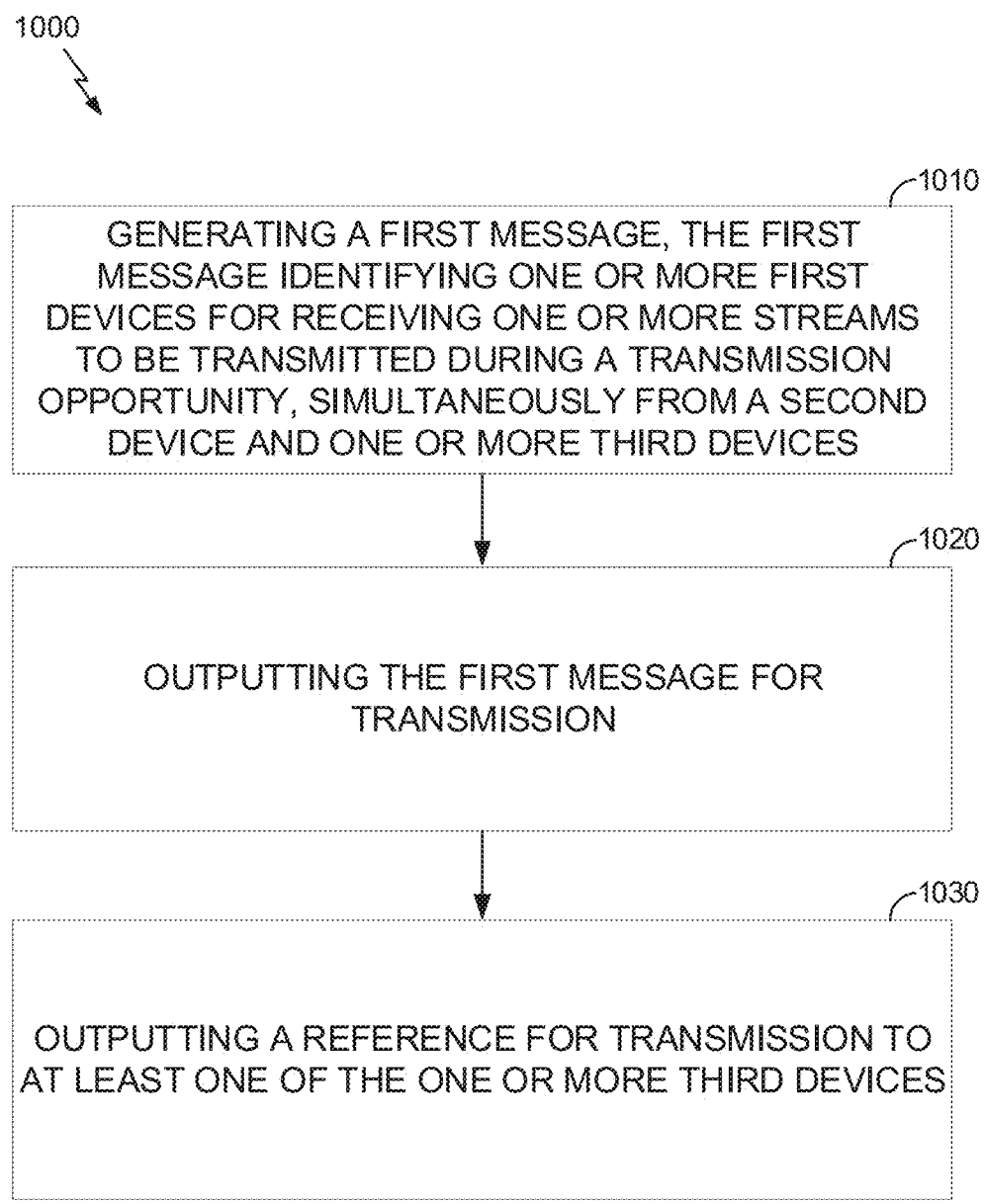
FIG. 10 depicts a method for establishing a distributed MIMO joint transmission opportunity between access points and one or more stations, in accordance with an exemplary embodiment.

FIG. 10 depicts a method 1000 for establishing a distributed MIMO joint transmission opportunity between APs 104 and one or more STAs 106, in accordance with an exemplary embodiment. In some aspects, the method 1000 discussed below with respect to FIG. 10 may be performed by the wireless device 202. For example, in some aspects, the memory 206 may store instructions that configure the processor 204 to perform one or more of the functions discussed below with respect to FIG. 10.

Some aspects of method 1000 provide a method of establishing, via a first AP 104, a distributed MIMO joint transmission opportunity with one or more second APs 104 to one or more STAs 106.

In block 1010, a first AP 104 generates a first message for transmission to the one or more STAs 106 or first devices and to the one or more second APs 104 or third devices. The first message identifies at least one of the one or more STAs 106 for receiving one or more streams to be transmitted during a transmission opportunity, simultaneously from the first AP 104 and the one or more second APs 104. The first message may further indicate a null data packet transmission by one of the first AP 104 or the second APs 104. The indication of the STA 106 configured to receive one or more streams may comprise a list of identifiers or BSSs 302 of the STAs 106 that will receive the streams.

In block 1020, the first AP 104 outputs or transmits the first message to the one or more second APs 104 and the one or more STAs 106. This transmission may occur over a wireless network or via the backhaul links 755a, 755b.

Optionally, at block 1030, the first AP 104 outputs a reference or reference phase signal for transmission to at least one of the one or more second APs 104. In some embodiments, the transmission of the reference or reference phase signal may occur over one of the wireless network or the backhaul links 755a, 755b. In some embodiments, the first AP 104 generates the reference or reference phase signal before transmitting the first message.

In some aspects, the first message is generated to include the reference or reference phase signal. In some aspects, the wireless device 202 further generates a phase synchronization message that includes the generated reference or reference phase signal and transmits the phase synchronization message to the second APs 104. In some embodiments, the phase synchronization message may be transmitted via the wireless network or via the backhaul links 755a, 755b. In some aspects, the phase synchronization message is transmitted to the second APs 104 on a periodic basis.

In some aspects, the wireless device 202 further determines a phase drift between a phase of the first AP 104 and one or more second APs 104, wherein the phase synchronization message is generated and transmitted when the phase drift exceeds a threshold value.

In some aspects, the wireless device 202 further generates a time synchronization signal to synchronize times between the first AP 104 and one or more second APs 104. The device also generates a frequency synchronization signal to synchronize frequencies between the first AP 104 and one or more second APs 104 and transmits the time synchronization signal and the frequency synchronization signal to the second APs 104. This transmission may occur over the wireless network or the backhaul links 755a, 755b. In some aspects, the reference or reference phase signal is based on a phase of the first AP 104.

In some aspects, the null data packet transmission is transmitted to the STAs 106 in the first message in sync with one or more other null data packets transmitted by the second APs 104 to the STAs 106. In some aspects, the null data packet is transmitted in sync with the one or more other null data packets based on the second APs 104 synchronizing respective phases with the phase of the first AP 104 based on the reference or reference phase signal.

Figure 11:
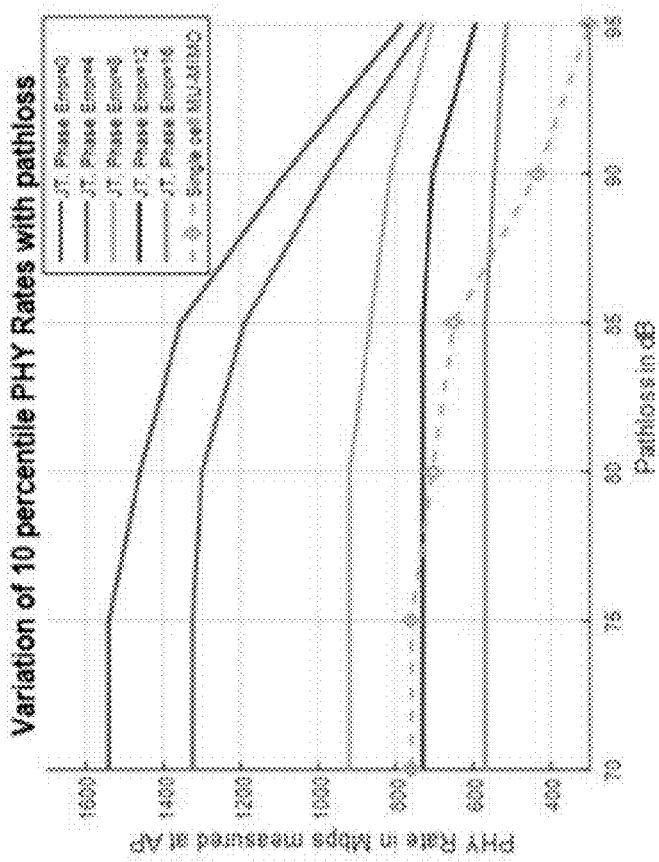
FIG. 11 depicts a graph showing PHY rate performance (e.g., path loss in PHY rates) at different levels of phase drift, in accordance with exemplary embodiments.

FIG. 11 depicts a graph 1100 showing PHY rate performance (e.g., pathloss in PHY rates) at different levels of phase drift, in accordance with exemplary embodiments. The graph 1100 depicts a sum of the PHY rate in Mbps at all participating APs 104 for the joint transmission along the y-axis and path loss in dB along the x-axis. The graph 1100 also depicts five joint transmissions, each having a different phase error (e.g., phase difference). The phase errors range from 0 to 16 in increments of 4. The graph 1100 also depicts a single cell MU-MIMO transmission.

As shown in the graph 1100, the PHY Rate for all communications decreases as the path loss increases. The graph 1100 also indicates that as the phase error increases, the PHY rate decreases. Thus, the joint transmission with the phase error of "0" has the greatest PHY rate of all joint transmissions, regardless of path loss. The joint transmission with the phase error of "4" has the PHY rate greater than all joint transmissions having higher phase error values, regardless of path loss. The joint transmission with the phase error of "8" has the PHY rate greater than all joint transmissions having higher phase error values, regardless of path loss. The joint transmission with the phase error of "12" has the PHY rate greater than all joint transmissions having higher phase error values, regardless of path loss. The joint transmission with the phase error of "16" has the lowest PHY rate shown. The single cell MU-MIMO transmission is shown having a higher PHY rate than both the joint transmissions with phase errors of "12" and "16" until the pathless exceeds approximately 87 dB, at which point the single cell MU-MIMO transmission PHY rate drops below that of all shown joint transmissions.

Accordingly, to maximize gains of joint transmission, the phase error between APs 104 may preferably be less than 4 degrees. Thus, as relative phase offsets between APs 104 drifts, performance may degrade. In some embodiments, path loss greater than 85 dB may not be a general concern in most network layouts, based on the network layout having multiple APs 104.

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. In some aspects, the means for outputting may comprise one or more of the receiver 212, the transceiver 214, the DSP 220, the processor 204, the memory 206, the signal detector 218, the cellular modem 234, the WLAN modem 238, or equivalents thereof. In some aspects, the means for outputting may comprise one or more of the transmitter 210, the transceiver 214, the DSP 220, the processor 204, the memory 206, the cellular modem 234, the WLAN modem 238, or equivalents thereof. In some aspects, the means for generating may comprise one or more of the DSP 220, the processor 204, the memory 206, the user interface 222, the cellular modem 234, the WLAN modem 238, or equivalents thereof.

Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of wireless communication comprising:
   generating a first message identifying one or more first devices for receiving one or more streams to be transmitted during a transmission opportunity, simultaneously from a second device and one or more third devices;
   outputting the first message for transmission;
   outputting a first reference for transmission to at least one of the one or more third devices; and
   outputting a second reference for transmission to at least one of the one or more third devices after outputting the first reference;
   wherein a phase difference between the first reference and the second reference is indicative of a phase correction for use by the one or more third devices during the transmission opportunity.

2. An apparatus for wireless communication comprising:
   a processing system configured to generate a first message identifying one or more first devices for receiving one or more streams to be transmitted during a transmission opportunity, simultaneously from a second device and one or more third devices; and
   an interface configured to:
      output the first message for transmission;
      output a first reference for transmission to at least one of the one or more third devices; and
      output a second reference for transmission to at least one of the one or more third devices after outputting the first reference;
      wherein a phase difference between the first reference and the second reference is indicative of a phase correction for use by the one or more third devices during the transmission opportunity.

3. The apparatus of claim 2, wherein the apparatus is one of the second device and the one or more third devices.

4. The apparatus of claim 2, wherein the transmission opportunity employs distributed multiple-access multiple-input multiple-output (MIMO).

5. The apparatus of claim 2, wherein the first message is a null data packet announcement (NDPA).

6. The apparatus of claim 2, wherein the processing system is further configured to precode data for transmission over an array of antennas, wherein the array of antennas comprises antennas of the second device and antennas of the one or more third devices.

7. The apparatus of claim 2, wherein at least one of the one or more streams is outputted simultaneously by the second device and the one or more third devices.

8. The apparatus of claim 2, wherein the interface is further configured to output the one or more streams as a null data packet transmission during a sounding period of the transmission opportunity.

9. The apparatus of claim 8, wherein the apparatus is the second device, and wherein the interface is further configured to output the null data packet transmission simultaneously with the one or more third devices outputting null data packet transmission.

10. The apparatus of claim 2, wherein the interface is further configured to output the one or more streams as a data transmission during a data transmission period of the transmission opportunity.

11. The apparatus of claim 2, wherein the processing system is further configured to generate a second message that is a null data packet transmission; and
wherein the interface is further configured to output the second message for transmission after outputting the first message.

12. The apparatus of claim 2, wherein the interface is configured to output the first reference for transmission after outputting the first message for transmission but before the one or more first devices receives the one or more streams.

13. The apparatus of claim 2, wherein the first reference is indicative of at least one of a phase of the second device, a timing of the second device, and a frequency of the second device.

14. The apparatus of claim 2, wherein the interface is configured to periodically output the first reference for transmission.

15. The apparatus of claim 2, wherein the processing system is further configured to generate a trigger message indicating when the one or more first devices is to transmit feedback; and wherein the interface is further configured to output the trigger message for transmission to the one or more first devices.

16. The apparatus of claim 15, wherein the trigger message further indicates whether the one or more first devices is to simultaneously transmit the feedback or to non-simultaneously transmit the feedback.

17. An access point comprising:
a processing system configured to:
generate a first message for transmission, the first message identifying one or more first devices for receiving one or more streams to be transmitted during a transmission opportunity, simultaneously from a second device and one or more third devices;
generate a first reference for transmission to at least one of the one or more third devices; and
generate a second reference for transmission to at least one of the one or more third devices after outputting the first reference;
wherein a phase difference between the first reference and the second reference is indicative of a phase correction for use by the one or more third devices during the transmission opportunity; and
a transmitter configured to transmit the first message, the first reference, and the second reference.

* * * * *